(12) United States Patent
Gao et al.

(10) Patent No.: US 10,798,686 B2
(45) Date of Patent: Oct. 6, 2020

(54) FREQUENCY DOMAIN SPREADING AND DE-SPREADING METHOD AND APPARATUS

(71) Applicant: CHINA ACADEMY OF TELECOMMUNICATIONS TECHNOLOGY, Beijing (CN)

(72) Inventors: Xuejuan Gao, Beijing (CN); Fang-Chen Cheng, Beijing (CN)

(73) Assignee: CHINA ACADEMY OF TELECOMUNICATIONS TECHNOLOGY, Beijing (CN)

( * ) Notice: Subject to any disclaimer, the term of this patent is extended or adjusted under 35 U.S.C. 154(b) by 21 days.

(21) Appl. No.: 15/763,087

(22) PCT Filed: Aug. 30, 2016

(86) PCT No.: PCT/CN2016/097382
§ 371 (c)(1),
(2) Date: Mar. 23, 2018

(87) PCT Pub. No.: WO2017/050100
PCT Pub. Date: Mar. 30, 2017

(65) Prior Publication Data
US 2018/0279294 A1    Sep. 27, 2018

(30) Foreign Application Priority Data
Sep. 25, 2015    (CN) .......................... 2015 1 0624978

(51) Int. Cl.
*H04W 56/00* (2009.01)
*H04W 72/04* (2009.01)
(Continued)

(52) U.S. Cl.
CPC ........ *H04W 72/0413* (2013.01); *H04B 1/707* (2013.01); *H04J 13/004* (2013.01);
(Continued)

(58) Field of Classification Search
CPC . H04W 72/0413; H04W 72/14; H04J 13/004; H04L 1/0026; H04L 1/0073;
(Continued)

(56) References Cited

U.S. PATENT DOCUMENTS

2009/0041139 A1 *    2/2009    Cho ...................... H04L 1/0026
                                                                   375/260
2010/0296557 A1 *    11/2010    Diaz Fuente ......... H04L 1/0042
                                                                   375/219
(Continued)

FOREIGN PATENT DOCUMENTS

CN        101330367 A        12/2008
CN        102014509 A         4/2011
(Continued)

OTHER PUBLICATIONS

IP Office of P.R. China—International Search Report of the International Searching Authority (with English Translation) dated Nov. 24, 2016 for International Application No. PCT/CN2016/097382 (6 pgs).

(Continued)

*Primary Examiner* — Sai Ming Chan
(74) *Attorney, Agent, or Firm* — Womble Bond Dickinson (US) LLP

(57) ABSTRACT

The present application provides a frequency domain spreading and de-spreading method and apparatus. In embodiments of the present application, user equipment acquires indication information of an orthogonal sequence used by a transmission physical uplink control channel (PUCCH); the user equipment spreads, according to an orthogonal sequence corresponding to the indication information of the orthogonal sequence, a frequency domain for uplink control information borne by the PUCCH; and the user equipment transmits, over a frequency domain resource corresponding to the PUCCH, the uplink control informa-
(Continued)

tion of which the frequency domain is spread. The present application can spread a frequency domain for uplink control information borne by a PUCCH.

28 Claims, 17 Drawing Sheets

(51) Int. Cl.
*H04L 1/00* (2006.01)
*H04L 1/16* (2006.01)
*H04J 13/00* (2011.01)
*H04L 5/00* (2006.01)
*H04B 1/707* (2011.01)
*H04W 72/14* (2009.01)

(52) U.S. Cl.
CPC .......... *H04L 1/0026* (2013.01); *H04L 1/0073* (2013.01); *H04L 1/1671* (2013.01); *H04L 5/0016* (2013.01); *H04L 5/0021* (2013.01); *H04L 5/0037* (2013.01); *H04W 72/14* (2013.01); *H04B 2201/698* (2013.01); *H04L 5/0055* (2013.01)

(58) Field of Classification Search
CPC ... H04L 1/1671; H04L 5/0016; H04L 5/0021; H04L 5/0037; H04B 1/707
USPC .......................................................... 370/329
See application file for complete search history.

(56) References Cited

U.S. PATENT DOCUMENTS

| | | | |
|---|---|---|---|
| 2012/0039275 A1* | 2/2012 | Chen ................... | H04L 1/1607 370/329 |
| 2012/0046032 A1 | 2/2012 | Baldemair et al. | |
| 2012/0069826 A1* | 3/2012 | Nakao ................. | H04L 5/0007 370/336 |
| 2012/0257553 A1* | 10/2012 | Noh .................... | H04J 11/0053 370/280 |
| 2013/0010720 A1* | 1/2013 | Lohr .................... | H04W 52/30 370/329 |
| 2013/0094524 A1 | 4/2013 | Harrison et al. | |
| 2013/0279485 A1* | 10/2013 | Gao ..................... | H04L 9/065 370/336 |
| 2015/0173068 A1 | 6/2015 | Han et al. | |
| 2016/0329998 A1* | 11/2016 | Li ....................... | H04L 5/0048 |
| 2017/0041911 A1* | 2/2017 | Yamamoto ........... | H04L 1/08 |

FOREIGN PATENT DOCUMENTS

| | | |
|---|---|---|
| CN | 102025442 A1 | 4/2011 |
| CN | 102870363 A | 1/2013 |
| CN | 103178926 A | 6/2013 |
| CN | 103209483 A | 7/2013 |
| CN | 103222224 A | 7/2013 |
| EP | 2538601 A2 | 12/2012 |
| EP | 2787674 A1 | 10/2014 |
| JP | 2013533654 A | 8/2013 |
| WO | WO 2011132987 A2 | 10/2011 |

OTHER PUBLICATIONS

IP Office of P.R. China—Written Opinion of the International Searching Authority dated Nov. 24, 2016 for International Application No. PCT/CN2016/097382 (3 pgs).
First Office Action for corresponding Chinese Patent Application No. 201510624978.X containing Chinese Search Report, 9 pp., (dated Jun. 5, 2018).
PCT International Preliminary Report on Patentability for PCT Application No. PCT/CN2016/097382 with full English translation, 9 pgs. (dated Mar. 27, 2018).
Supplementary Search for Chinese Patent Application No. 201510624978.X, issued by SIPO dated Jan. 2, 2019.
The Fourth Official Chinese Office Action for Application No. 201510624978.X dated May 20, 2019, 9 pages.
The Extended European Search Report for Application No. 16847982.2 dated Sep. 17, 2018, 8 pages.
The Japanese Office Action for Application No. 2018515879 dated Dec. 27, 2019, 3 pages.

* cited by examiner

FREQUENCY DOMAIN SPREADING AND DE-SPREADING METHOD AND APPARATUS

CROSS-REFERENCE TO RELATED APPLICATIONS

This patent application is a U.S. National Phase application under 35 U.S.C. § 371 of International Application No. PCT/CN2016/097382, filed on 30 Aug. 2016, entitled FREQUENCY DOMAIN SPREADING AND DE-SPREADING METHOD AND APPARATUS, which claims the benefit of priority of Chinese Patent Application No. 20150624978.X, filed with the Chinese Patent Office on Sep. 25, 2015 and entitled "A method and apparatus for frequency domain spreading, and a method and apparatus for frequency domain de-spreading", the contents of which was incorporated by reference in its entirety.

FIELD

The present disclosure relates to the field of wireless communications, and particularly to a method and apparatus for frequency domain spreading, and a method and apparatus for frequency domain de-spreading.

BACKGROUND

Aggregation of at most 32 carriers is supported in a Carrier Aggregation (CA) system in the Long Term Evolution-Advanced (LTE-A) Release 13 (Rel 13). With the growing number of carriers to be aggregated, there is also a significantly growing amount of Acknowledgement (ACK) or Non-Acknowledgement (NACK) feedback to be made by a User Equipment (user equipment), so a new Physical Uplink Control Channel (PUCCH) with a higher capacity has been proposed at present to carry more Uplink Control Information (UCI).

The new PUCCH format based on a Physical Uplink Shared Channel (PUSCH) structure can carry more bit codes and modulation symbols, and theoretically can support multiple-bit ACK/NACK feedback for more than 5 carriers to be aggregated.

However there has been absent so far a solution to spreading on the PUCCH in the new PUCCH format to increase the number of user equipments for multiplexing in a Physical Resource Block (PRB), and to lower an overhead of PUCCH resources.

SUMMARY

Embodiments of the disclosure provide a method and apparatus for frequency domain spreading, and a method and apparatus for frequency domain de-spreading so as to spread uplink control information carried over a PUCCH in the frequency domain.

An embodiment of the disclosure provides a method for spreading and transmitting in the frequency domain, the method including: obtaining, by a user equipment, indication information of an orthogonal sequence for transmitting a Physical Uplink Control Channel (PUCCH); spreading, by the user equipment, uplink control information carried in the PUCCH in the frequency domain according to the indication information of the orthogonal sequence; and transmitting, by the user equipment, the uplink control information after spreading, over frequency resources corresponding to the PUCCH.

An embodiment of the disclosure provides a method for frequency domain de-spreading, the method including: receiving, by a base station, a Physical Uplink Control Channel (PUCCH) over frequency resources corresponding to the PUCCH; determining, by the base station, indication information of an orthogonal sequence for the PUCCH; and de-spreading, by the base station, uplink control information carried in the PUCCH in the frequency domain using the orthogonal sequence corresponding to the indication information of the orthogonal sequence.

An embodiment of the disclosure provides a user equipment including: an obtaining module configured to obtain indication information of an orthogonal sequence for transmitting a Physical Uplink Control Channel (PUCCH); a spreading module configured to spread uplink control information carried in the PUCCH in the frequency domain according to the orthogonal sequence corresponding to the indication information of the orthogonal sequence; and a transmitting module configured to transmit the uplink control information after spreading, over frequency resources corresponding to the PUCCH.

An embodiment of the disclosure provides a base station including: a receiving module configured to receive a Physical Uplink Control Channel (PUCCH) over frequency resources corresponding to the PUCCH; a determining module configured to determine indication information of an orthogonal sequence for the PUCCH; and a de-spreading module configured to de-spread uplink control information carried in the PUCCH in the frequency domain using the orthogonal sequence corresponding to the indication information of the orthogonal sequence.

An embodiment of the disclosure provides a user equipment including: a processor configured to read and execute program in a memory: to obtain indication information of an orthogonal sequence for transmitting a Physical Uplink Control Channel (PUCCH); to spread uplink control information carried in the PUCCH in the frequency domain according to the orthogonal sequence corresponding to the indication information of the orthogonal sequence; and to transmit the uplink control information after spreading, over frequency resources corresponding to the PUCCH through a transceiver; and the transceiver configured to be controlled by the processor to receive and transmit data.

An embodiment of the disclosure provides a base station including: a processor configured to read and execute program in a memory: to receive a Physical Uplink Control Channel (PUCCH) over frequency resources corresponding to the PUCCH through a transceiver; to determine indication information of an orthogonal sequence for the PUCCH; and to de-spread uplink control information carried in the PUCCH in the frequency domain using the orthogonal sequence corresponding to the indication information of the orthogonal sequence; and the transceiver configured to be controlled by the processor to receive and transmit data.

With the embodiments above of the disclosure, the user equipment obtains the information about the orthogonal sequence for the PUCCH, spreads the uplink control information carried in the PUCCH in the frequency domain according to the orthogonal sequence corresponding to the indication information of the orthogonal sequence, and transmits the uplink control information over the frequency resources corresponding to the PUCCH, so that the PUCCH can be spread in the frequency domain, and furthermore the number of user equipments for multiplexing in a PRB can be increased, and an overhead of PUCCH resources can be lowered.

BRIEF DESCRIPTION OF THE DRAWINGS

In order to make the technical solutions according to the embodiments of the disclosure more apparent, the drawings to which the embodiments are described with reference will be described below in brief; and apparently the drawings in the following description are only some of the embodiments of the disclosure, and those ordinarily skilled in the art can further derive from these drawings other drawings without any inventive effort. In the drawings.

DETAILED DESCRIPTION OF THE EMBODIMENTS

Figure 1:
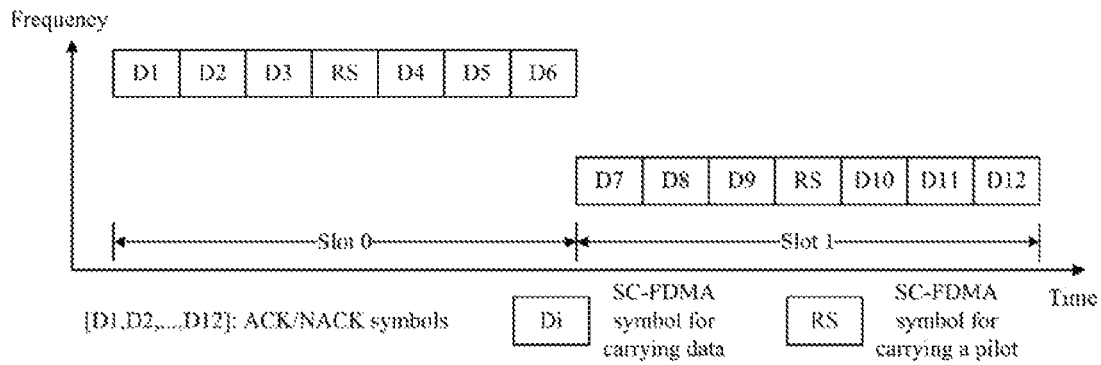
FIG. 1 is a schematic diagram of a new PUCCH format carrying feedback information for 5 carriers to be aggregated in the prior art.

As described in the Background section, the PUCCH format for transmitting ACK/NACK as defined in the earlier release has failed to satisfy the demand for transmitting more ACK/NACK feedback bits, so a new PUCCH format with a higher capacity emerges. FIG. 1 illustrates a schematic structural diagram of a new PUCCH format, where Di represents the i-th symbol sequence, and when the new PUCCH format is used for transmission in only one PRB in the frequency domain, there are 12 symbols in each Di, which are mapped respectively onto 12 sub-carriers in a Single Carrier-Frequency Division Multiple Access (SC-FDMA) symbol. For example, suppose only one PRB is occupied for transmitting a PUCCH, and in the case that: there is only one symbol used for pilot in a slot with a normal Cyclic Prefix (CP), and the Quadrature Phase-Shift Keying (QPSK) modulation scheme is applied, the new PUCCH format can carry 288 bits of encoded information, i.e., 144 modulation symbols.

Since not so many as 32 carriers are aggregated for a user equipment all the time, the user equipment may operate with the single-Transport Block (TB) or multi-TB transmission mode variably, and furthermore the number of carriers really scheduled for the user equipment is less than or equal to the number of configured carriers, there are different numbers of ACK/NACK feedback bits of the user equipment in different configuration instances and in different sub-frames. When the new PUCCH format is used for transmitting multi-carrier periodical Channel State Information (CSI), since the CSI is fed back only for an activated carrier, the number of activated carriers may vary after a period of time, and furthermore there are different feedback bits for different periodical CSI reporting modes, there are different numbers of periodical CSI bits in different configuration instances and in different sub-frames. When transmission of both ACK/NACK and periodical CSI in the new PUCCH format is supported, since the periodical CSI is not present in each sub-frame, and there are different numbers of periodical CSI feedback bits for different numbers of activated carriers and different periodical CSI reporting modes, there are also different total numbers of UCI bits in different configuration instances and in different sub-frames. If 288 encoded bits are transmitted all the time for above circumstances, then there are different code rates for different numbers of ACK/NACK feedback bits or different numbers of UCI feedback bits, so there may be a significantly redundant code rate. For example, there is a code rate of 1/2 for 144 bits of UCI (which may be ACK/NACK, or periodical CSI, or ACK/NACK and periodical CSI), a code rate of 1/3 for 96 bits of UCI, and a code rate of 1/4 for 72 bits of UCI; and when there is a low code rate, a demand for transmission performance has been exceeded, thus resulting in redundant transmission of the encoded bits, and degrading the efficiency of transmission.

There has been absent so far a specific solution to support feedback of a plurality of bits of ACK/NACK for more than 5 carriers to be aggregated. From the perspective of improving the capacity of user equipments for multiplexing in a PRB, if spreading and transmission is performed in the time domain, then a uniform time-domain spreading design may not be applicable because there are different numbers of symbols, for carrying data, in a normal CP and an extended CP, and a normal PUCCH format and a shortened PUCCH format (where the last symbol is reserved for an Sounding Reference Signal (SRS) instead of data to be transmitted). There are a fixed number of REs available in the frequency domain in the new PUCCH format, so a uniform spreading solution may be applicable.

In view of this, embodiments of the disclosure provide a solution to spreading in the frequency domain, and a corresponding solution to de-spreading in the frequency domain so as to spread in the frequency domain an orthogonal sequence corresponding to symbols, for carrying data, in a new PUCCH format, and to cyclically shift pilot information in symbols, for carrying a pilot, in a PUCCH at a cyclic shift interval of A, to thereby support multiplexed transmission by a plurality of user equipments in PRBs occupied by one PUCCH.

Firstly an orthogonal sequence in the embodiments of the disclosure will be described below.

(I) The length of an orthogonal sequence is described as follows.

The length of an orthogonal sequence for transmitting a PUCCH is represented as $N_{SF}^{PUCCH}$.

Preferably $N_{SF}^{PUCCH}$ is a positive integer exactly divisible by M, where M is the number of sub-carriers occupied by a PRB, and M is a positive integer. For example, in the case that 12 sub-carriers are occupied by a PRB, the value of $N_{SF}^{PUCCH}$ may be one of 1, 2, 3, 4, and 6.

Here the lengths of orthogonal sequences corresponding to all or a part of SC-FDMA symbols, for transmitting a PUCCH, in the same sub-frame may or may not be the same.

(II) A relationship between an orthogonal sequence and an SC-FDMA symbol is described as follows.

Preferably an orthogonal sequence corresponding to an SC-FDMA symbol for transmitting data (as opposed to an SC-FDMA symbol for transmitting a reference signal) may be specified as follows.

Orthogonal sequences corresponding to all of SC-FDMA symbols, for transmitting data, in the same sub-frame are the same.

Or, orthogonal sequences corresponding to different SC-FDMA symbols, for transmitting data, in the same slot are the same, and orthogonal sequences corresponding to SC-FDMA symbols, for transmitting data, in different slots are different.

Or, orthogonal sequences corresponding to SC-FDMA symbols, for transmitting data, with the same index in different slots are the same, and orthogonal sequences corresponding to SC-FDMA symbols, for transmitting data, with different indexes in the same slot or different slots are different.

Or, orthogonal sequences corresponding to respective SC-FDMA symbols, for transmitting a PUCCH, in the same sub-frame are different from each other.

(III) Types of orthogonal sequences are described as follows.

In the embodiments of the disclosure, the orthogonal sequence may be one or more of a Walsh code orthogonal sequence, a Discrete Fourier Transform (DFT) orthogonal sequence, and a Discrete Cosine Transform (DCT) orthogonal sequence. Other orthogonal sequences will not be precluded.

Examples of the orthogonal sequence will be given below with several different values of $N_{SF}^{PUCCH}$.

With $N_{SF}^{PUCCH}=1$, the orthogonal sequence is [1]; or with $N_{SF}^{PUCCH}=1$, no spreading in the frequency domain is defined.

With $N_{SF}^{PUCCH}=2$, the orthogonal sequences include [+1 +1] and [+1 −1], and a correspondence relationship between an orthogonal sequence and an orthogonal sequence index ($n_{oc}$) can be as depicted in Table 1:

TABLE 1

| Orthogonal sequences [w(0) ... w($N_{SF}^{PUCCH}$ − 1)] with $N_{SF}^{PUCCH}$ = 2 | |
|---|---|
| Sequence index $n_{oc}$ | Orthogonal sequences [w(0) ... w($N_{SF}^{PUCCH}$ − 1)] |
| 0 | [+1 +1] |
| 1 | [+1 −1] |

With $N_{SF}^{PUCCH}=3$, the orthogonal sequences include [1 1 1], [1 $e^{j2\pi/3}$ $e^{j4\pi/3}$], and [1 $e^{j4\pi/3}$ $e^{j2\pi/3}$], and a correspondence relationship between an orthogonal sequence and an orthogonal sequence index ($n_{oc}$) can be as depicted in Table 2:

TABLE 2

| Orthogonal sequences [w(0) ... w($N_{SF}^{PUCCH}$ − 1)] with $N_{SF}^{PUCCH}$ = 3 | |
|---|---|
| Sequence index $n_{oc}$ | Orthogonal sequences [w(0) ... w($N_{SF}^{PUCCH}$ − 1)] |
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

With $N_{SF}^{PUCCH}=4$, the orthogonal sequences include [+1 +1 +1 +1], [+1 −1 +1 −1], [+1 −1 −1 +1], and [+1 +1 −1 −1], and a correspondence relationship between an orthogonal sequence and an orthogonal sequence index ($n_{oc}$) can be as depicted in Table 3:

TABLE 3

| Orthogonal sequences [w(0) ... w($N_{SF}^{PUCCH}$ − 1)] with $N_{SF}^{PUCCH}$ = 4 | |
|---|---|
| Sequence index $n_{oc}$ | Orthogonal sequences [w(0) ... w($N_{SF}^{PUCCH}$ − 1)] |
| 0 | [+1 +1 +1 +1] |
| 1 | [+1 −1 +1 −1] |
| 2 | [+1 −1 −1 +1] |
| 3 | [+1 +1 −1 −1] |

With $N_{SF}^{PUCCH}=6$, the orthogonal sequences include [1 1 1 1 1 1], [1 $e^{j\pi/3}$ $e^{j2\pi/3}$ −1 $e^{j4\pi/3}$ $e^{j5\pi/3}$], [1 $e^{j2\pi/3}$ $e^{j4\pi/3}$ 1 $e^{j2\pi/3}$ $e^{j4\pi/3}$], [1 −1 1 −1 1 −1], [1 $e^{j4\pi/3}$ $e^{j2\pi/3}$ 1 $e^{j4\pi/3}$ $e^{j2\pi/3}$], and [1 $e^{j5\pi/3}$ $e^{j4\pi/3}$ −1 $e^{j2\pi/3}$ $e^{j\pi/3}$], and a correspondence relationship between an orthogonal sequence and an orthogonal sequence index ($n_{oc}$) can be as depicted in Table 4:

TABLE 4

| Orthogonal sequences [w(0) ... w($N_{SF}^{PUCCH}$ − 1)] with $N_{SF}^{PUCCH}$ = 6 | |
|---|---|
| Sequence index $n_{oc}$ | Orthogonal sequences [w(0) ... w($N_{SF}^{PUCCH}$ − 1)] |
| 0 | [1 1 1 1 1 1] |
| 1 | [1 $e^{j\pi/3}$ $e^{j2\pi/3}$ −1 $e^{j4\pi/3}$ $e^{j5\pi/3}$] |
| 2 | [1 $e^{j2\pi/3}$ $e^{j4\pi/3}$ 1 $e^{j2\pi/3}$ $e^{j4\pi/3}$] |
| 3 | [1 −1 1 −1 1 −1] |
| 4 | [1 $e^{j4\pi/3}$ $e^{j2\pi/3}$ 1 $e^{j4\pi/3}$ $e^{j2\pi/3}$] |
| 5 | [1 $e^{j5\pi/3}$ $e^{j4\pi/3}$ −1 $e^{j2\pi/3}$ $e^{j\pi/3}$] |

It shall be noted that the correspondence relationships as depicted in Table 1 to Table 4 above are only examples, but other instances of the correspondence relationship will not be precluded, for example, a correspondence order may be altered, etc.

A flow of spreading and transmitting in the frequency domain according to an embodiment of the disclosure will be described below in details with reference to the drawings.

Figure 2:
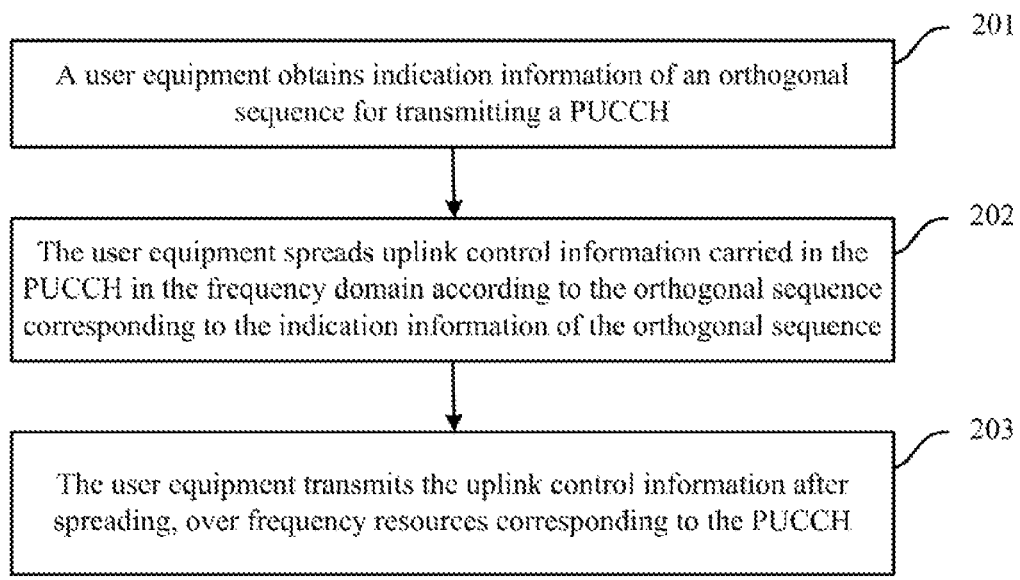
FIG. 2 is a schematic flow chart of spreading and transmitting in the frequency domain according to an embodiment of the disclosure.

Referring to FIG. 2 which is a schematic flow chart of spreading and transmitting in the frequency domain according to an embodiment of the disclosure, the flow is performed at the user equipment side.

As illustrated, the flow can include the step 201 to the step 203.

In the step 201, a user equipment obtains indication information of an orthogonal sequence for transmitting a PUCCH.

Here the format of the PUCCH can be a defined PUCCH format capable of carrying UCI feedback information for five carriers to be aggregated, e.g., a new PUCCH format based on a PUSCH structure, or a new PUCCH format based on a format-3 structure.

The indication information of the orthogonal sequence for transmitting a PUCCH can be an index of the orthogonal sequence.

The orthogonal sequence for transmitting a PUCCH may be the same in a different range, and particularly one of the following instances may be possible.

Orthogonal sequences corresponding to all of SC-FDMA symbols, for transmitting data, in the same sub-frame are the same.

The indexes of orthogonal sequences corresponding to SC-FDMA symbols, for transmitting data, in the same slot are the same, and orthogonal sequences corresponding to SC-FDMA symbols, for transmitting data, in different slots are different. Taking two slots (including an odd slot and an even slot) in a sub-frame as an example, an orthogonal sequence corresponding to an SC-FDMA symbol, for transmitting data, in an odd slot is different from an orthogonal sequence corresponding to an SC-FDMA symbol, for transmitting data, in an even slot, in the same sub-frame. If indexes of slots in different sub-frames are the same, then orthogonal sequences corresponding to SC-FDMA symbols, for transmitting data, in odd slots in the different sub-frames may be the same, and orthogonal sequences corresponding to SC-FDMA symbols, for transmitting data, in even slots in the different sub-frames may also be the same. If indexes of slots in different sub-frames are different, then orthogonal sequences corresponding to SC-FDMA symbols, for transmitting data, in odd slots in the different sub-frames are different, and orthogonal sequences corresponding to SC-FDMA symbols, for transmitting data, in even slots in the different sub-frames are also different.

Orthogonal sequences corresponding to SC-FDMA symbols, for transmitting data, with the same index in different slots are the same, and orthogonal sequences corresponding to SC-FDMA symbols, for transmitting data, with different indexes in the same slot or different slots are different. Taking two slots (including an odd slot and an even slot), in each of which there are 7 SC-FDMA symbols, in a sub-frame as an example, if indexes of SC-FDMA symbols in an odd slot and in an even slot respectively in the same sub-frame start with 0 and end with 6, then orthogonal sequences corresponding to SC-FDMA symbols, for transmitting data, with the same index of i in the odd slot and in the even slot may be the same, and orthogonal sequences corresponding to SC-FDMA symbols, for transmitting data, with the index of i and the index of j in any slot may be different. Since indexes of SC-FDMA symbols in each sub-frame are the same, the above approaches will apply to each sub-frame.

Orthogonal sequences corresponding to respective SC-FDMA symbols, for transmitting a PUCCH, in the same sub-frame are different from each other. If indexes of slots in different sub-frames are different, then orthogonal sequences corresponding to SC-FDMA symbols, for transmitting data, in the slots may be different from each other. Taking two slots (including an odd slot and an even slot) in a sub-frame as an example, in the same sub-frame, orthogonal sequences corresponding to respective SC-FDMA symbols, for transmitting data, in an odd slot are different from each other, orthogonal sequences corresponding to respective SC-FDMA symbols, for transmitting data, in an even slot are different from each other, and the orthogonal sequences corresponding to the respective SC-FDMA symbols, for transmitting data, in the odd slot and the even slot are different from each other. If indexes of slots in different sub-frames are the same, then orthogonal sequences of these two sub-frames may be determined in the same way; and if indexes of slots in different sub-frames are different, then orthogonal sequences corresponding to SC-FDMA symbols in the different sub-frames may be different from each other.

By way of an example in which the indication information of the orthogonal sequence is an index of the orthogonal sequence, several notifying modes of the index of the orthogonal sequence will be given according to the embodiment of the disclosure, and listed below.

In a first notifying mode, the index of the orthogonal sequence is notified explicitly via higher-layer signaling.

The index of the orthogonal sequence is notified via the higher-layer signaling, e.g., Radio Resource Control (RRC) signaling. Accordingly the user equipment can obtain the index of the orthogonal sequence for transmitting a PUCCH according to the received higher-layer signaling.

In a second notifying mode, the index of the orthogonal sequence is notified explicitly via downlink control information.

The index of the orthogonal sequence is notified in a bit field in the downlink control information, and for example, the index of the orthogonal sequence, or indication information of the sequence index can be carried in a specific bit field in a Downlink Control Information (DCI) carried in a Physical Downlink Shared Channel (PDCCH) or an Enhanced Physical Downlink Control Channel (EPDCCH). Accordingly the user equipment can obtain the index of the orthogonal sequence for transmitting a PUCCH according to the bit field in the received downlink control information.

In a third notifying mode, the index of the orthogonal sequence is notified explicitly via higher-layer signaling and downlink control information.

An index set including indexes of at least two orthogonal sequences is pre-configured via the higher-layer signaling, and the index of the orthogonal sequence, which is one of the indexes in the pre-configured index set, is notified in a bit field in the downlink control information.

In a fourth notifying mode, the index of the orthogonal sequence is notified implicitly via a channel resource index of a PUCCH.

In this mode, the user equipment can determine the index of the orthogonal sequence for the PUCCH according to the channel resource index of the PUCCH, that is, the network side does not notify the index of the orthogonal sequence directly, but the user equipment calculates it from the channel resource index of the PUCCH according to a predefined rule or algorithm. The following several rules for determining an index of an orthogonal sequence for a PUCCH will be listed below according to the embodiment of the disclosure.

A first rule is that an index of an orthogonal sequence for a PUCCH in a sub-frame in which the PUCCH is transmitted is determined at least according to a channel resource index of the PUCCH and the length of the orthogonal sequence for the PUCCH.

Particularly the index of the orthogonal sequence is $n_{oc}=f(n_{PUCCH}^{(4)}, N_{SF}^{PUCCH})$, that is, $n_{oc}$ is determined according to a channel resource index $n_{PUCCH}^{(4)}$ of the new PUCCH format and the length $N_{SF}^{PUCCH}$ of the orthogonal sequence. For example, $n_{oc}=n_{PUCCH}^{(4)}$ mod $N_{SF}^{PUCCH}$, where mod represents a remainder operation. This rule can be applicable to such a scenario that there is the same index of orthogonal sequences corresponding to all of SC-FDMA symbols, for transmitting data, in a sub-frame.

A second rule is that an index of an orthogonal sequence for a PUCCH in a slot of a sub-frame in which the PUCCH is transmitted is determined at least according to a channel resource index of the PUCCH, the length of the orthogonal sequence for the PUCCH, and an index of the slot including the PUCCH.

Particularly the index of the orthogonal sequence is $n_{oc}=f(n_{PUCCH}^{(4)}, N_{SF}^{PUCCH}, n_s)$, that is, an index $n_{oc}$ of an orthogonal sequence for a PUCCH in a slot is determined according to a channel resource index $n_{PUCCH}^{(4)}$ of the new PUCCH format, the length $N_{SF}^{PUCCH}$ of the orthogonal sequence, and an index $n_s$ of the slot. This rule can be applicable to such a scenario that there is the same index of orthogonal sequences corresponding to SC-FDMA symbols, for transmitting data, in slots with the same slot index, and orthogonal sequences corresponding to SC-FDMA symbols, for transmitting data, in slots with different slot indexes are different.

A third rule is that an index of an orthogonal sequence corresponding to a PUCCH in an SC-FDMA symbol of a sub-frame in which the PUCCH is transmitted is determined at least according to a channel resource index of the PUCCH, the length of the orthogonal sequence for the PUCCH, and an index of the SC-FDMA symbol for transmitting the PUCCH.

Particularly the index of the orthogonal sequence $n_{oc}=f(n_{PUCCH}^{(4)}, N_{SF}^{PUCCH}, l)$, that is, an index $n_{oc}$ of an orthogonal sequence corresponding to an SC-FDMA symbol is determined according to a channel resource index $n_{PUCCH}^{(4)}$ of the new PUCCH format, the length $N_{SF}^{PUCCH}$ of the orthogonal sequence, and an index l of the SC-FDMA symbol. This rule is applicable to such a scenario that different SC-FDMA symbols, for transmitting data, in the same slot correspond to different orthogonal sequences.

A fourth rule is that an index of an orthogonal sequence corresponding to a PUCCH in an SC-FDMA symbol of a slot of a sub-frame in which the PUCCH is transmitted is determined at least according to a channel resource index of the PUCCH, the length of the orthogonal sequence for the PUCCH, an index of the slot, and an index of the SC-FDMA symbol in the slot.

Particularly the index of the orthogonal sequence is $n_{oc}=f(n_{PUCCH}^{(4)}, N_{SF}^{PUCCH}, n_s, l)$, that is, an index $n_{oc}$ of an orthogonal sequence corresponding to an SC-FDMA symbol in a slot is determined according to a channel resource index $n_{PUCCH}^{(4)}$ of the new PUCCH format, the length $N_{SF}^{PUCCH}$ of the orthogonal sequence, an index $n_s$ of the slot, and an index l of the SC-FDMA symbol in the slot. This rule can be applicable to such a scenario that indexes of orthogonal sequences corresponding to SC-FDMA symbols in slots with different indexes are different from each other, and indexes of orthogonal sequences corresponding to different SC-FDMA symbols, for transmitting data, in the same slot are different from each other.

Here the channel resource index of the PUCCH can be notified via DCI, and for example, the channel resource index of the PUCCH is indicated in a specific bit field in the DCI. The channel resource index of the PUCCH can alternatively be notified via higher-layer signaling, and for example, the channel resource index of the PUCCH is indicated in a specific bit field in the higher-layer signaling. The channel resource index of the PUCCH can alternatively be notified jointly via DCI and higher-layer signaling, and for example, the network side pre-configures the user equipment with a channel resource index set of the PUCCH via the higher-layer signaling, where the set at least includes two channel resource index groups, and each group at least includes one channel resource index, and the network side further indicates one of the channel resource index groups in the set to the user equipment in a specific bit field in the DCI.

In the step 202, the user equipment spreads uplink control information carried in the PUCCH in the frequency domain according to the orthogonal sequence corresponding to the indication information of the orthogonal sequence.

In this step, the obtained orthogonal sequence for frequency domain spreading can be represented as: $[w1, w2, \ldots, w_{N_{SF}^{PUCCH}}]$.

Where $N_{SF}^{PUCCH}$ represents the length of the orthogonal sequence, i.e., the number of orthogonal codes in the orthogonal sequence, and for example, $w1, w2, \ldots, w_{N_{SF}^{PUCCH}}$ in the orthogonal sequence represent different orthogonal codes. $N_{SF}^{PUCCH}$ is a positive integer exactly divisible by M, where M is the number of sub-carriers occupied by a PRB, and M is a positive integer. Typically 12 sub-carriers are occupied by a PRB, so the value of $N_{SF}^{PUCCH}$ may be any one of 1, 2, 3, 4, and 6 accordingly. Furthermore there is the same length of orthogonal sequences corresponding to all or a part of SC-FDMA symbols, for transmitting a PUCCH, in the same sub-frame.

The uplink control information carried in the PUCCH is modulated into a plurality of data symbols (which are baseband digital signals) in a baseband modulation process, and each data symbol is mapped onto a Resource Element (RE) in an SC-FDMA symbol in subsequent resource mapping. Accordingly when the uplink control information carried in the PUCCH is spread in the frequency domain in the step 202, each data symbol of the PUCCH is multiplied with a corresponding orthogonal sequence, and a data symbol after spreading is obtained and mapped onto $N_{SF}^{PUCCH}$ resource elements in an SC-FDMA symbol. Before a data symbol of the PUCCH is spread in the frequency domain, an SC-FDMA symbol corresponding to the data symbol needs to be determined, and the data symbol is spread in the frequency domain using an orthogonal sequence corresponding to the SC-FDMA symbol, unless orthogonal sequences corresponding to all of SC-FDMA symbols are the same.

As described above, if the length of an orthogonal sequence corresponding to an SC-FDMA symbol onto which a data symbol of the PUCCH is mapped is $N_{SF}^{PUCCH}$, then the data symbol may be mapped onto $N_{SF}^{PUCCH}$ REs in the SC-FDMA symbol.

Furthermore REs in an RE group onto which a data symbol is mapped ($N_{SF}^{PUCCH}$ REs, onto which a data symbol is mapped, are referred to as an RE group) may be distributed consecutively in the frequency domain, or may be distributed discretely in the frequency domain. If REs in an RE group onto which a data symbol is mapped are distributed discretely in the frequency domain, then there may be the same or different spacing in the frequency domain between two adjacent REs in the RE group.

Furthermore if there is the same spacing in the frequency domain between two adjacent REs in an RE group, then the spacing in the frequency domain between adjacent REs in any one RE group may be the same as the spacing in the frequency domain between adjacent REs in another RE group, or the spacing between two adjacent REs in at least one RE group may be different from the spacing between two adjacent REs in another RE group.

Furthermore for RE groups onto which different data symbols are mapped, REs in the different RE groups may be distributed alternately or in parallel (that is, the REs in the different RE groups are not distributed alternately in the frequency domain).

Spreading and mapping in the frequency domain on a data symbol of a PUCCH will be described below taking $N_{SF}^{PUCCH}$=2, 3, 4, and 6 as an example respectively, and with reference to the drawings.

A first scenario relates to an example of spreading in the frequency domain with $N_{SF}^{PUCCH}$=2.

This example illustrates mapping in one PRB, where 12 sub-carriers are occupied in the frequency domain and one slot is occupied in the time domain by the PRB. Taking a normal Cyclic Prefix (CP) which is a guard interval as an example, there are 7 SC-FDMA symbols in one slot, and there is only one column of pilot symbols in one slot. For the sake of a convenient description, REs in an SC-FDMA symbol in the PRB will be referred to as RE0 to RE11 in an order of ascending frequencies.

In this example, 6 data symbol groups (denoted by D1 to D6 as illustrated) of a PUCCH are spread in the frequency domain using orthogonal sequences [w1, w2] respectively, and the spread data symbols are mapped onto resources, where each data symbol group Di includes 6 data symbols transmitted respectively in 6 SC-FDMA symbols, for carrying data, in a slot, and if each data symbol $d_{i,l}$ in each data symbol group Di corresponds to a different orthogonal sequence, then each $d_{i,l}$ may be spread in the frequency domain using the orthogonal sequence corresponding to $d_{i,l}$ respectively, and the spread data may be mapped onto corresponding REs in the SC-FDMA symbol corresponding to $d_{i,l}$, where $d_{i,l}$ represents such a data symbol in Di that is transmitted correspondingly in an SC-FDMA symbol with an SC-FDMA symbol index of l.

Figure 3A:
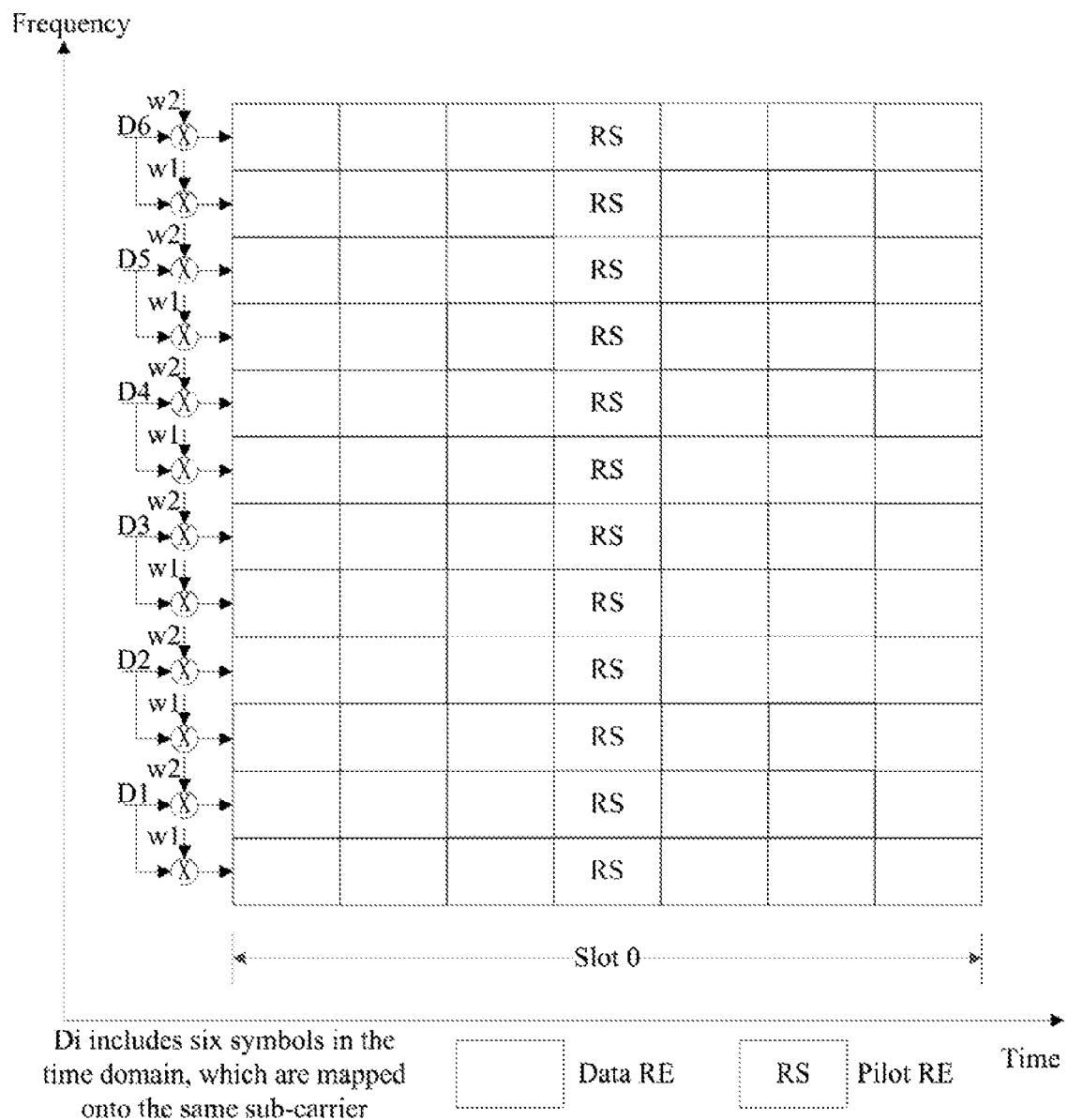
FIG. 3a to FIG. 3c are schematic diagrams of spreading and mapping in the frequency domain in a first scenario according to an embodiment of the disclosure.

As illustrated in FIG. 3a, after such a data symbol in D1 that is transmitted in the first SC-FDMA symbol for carrying data is spread in the frequency domain using a length factor of 2, the data symbol is mapped onto {RE0, RE1} in the first SC-FDMA symbol for carrying data; after such a data symbol in D2 that is transmitted in the first SC-FDMA symbol for carrying data is spread in the frequency domain using a length factor of 2, the data symbol is mapped onto {RE2, RE3} in the first SC-FDMA symbol for carrying data; after such a data symbol in D3 that is transmitted in the first SC-FDMA symbol for carrying data is spread in the frequency domain using a length factor of 2, the data symbol is mapped onto {RE4, RE5} in the first SC-FDMA symbol for carrying data; and so on until all the data in the first SC-FDMA symbol for carrying data are spread and then mapped. Alike, after such a data symbol in D1 that is transmitted in the second SC-FDMA symbol for carrying data is spread in the frequency domain using a length factor of 2, the data symbol is mapped onto {RE0, RE1} in the first SC-FDMA symbol for carrying data; after such a data symbol in D2 that is transmitted in the second SC-FDMA symbol for carrying data is spread in the frequency domain using a length factor of 2, the data symbol is mapped onto {RE2, RE3} in the second SC-FDMA symbol for carrying data; after such a data symbol in D3 that is transmitted in the second SC-FDMA symbol for carrying data is spread in the frequency domain using a length factor of 2, the data symbol is mapped onto {RE4, RE5} in the second SC-FDMA symbol for carrying data; and so on until all the data in the second SC-FDMA symbol for carrying data are spread and then mapped. Furthermore this is repeated until all the data in each SC-FDMA symbol for carrying data are spread and then mapped. As can be apparent, two REs, onto which a data symbol is mapped, are consecutive in the frequency domain, and the RE groups, onto which the different data symbols are mapped, are not distributed alternately in the frequency domain (that is, they are distributed in parallel).

Figure 3B:
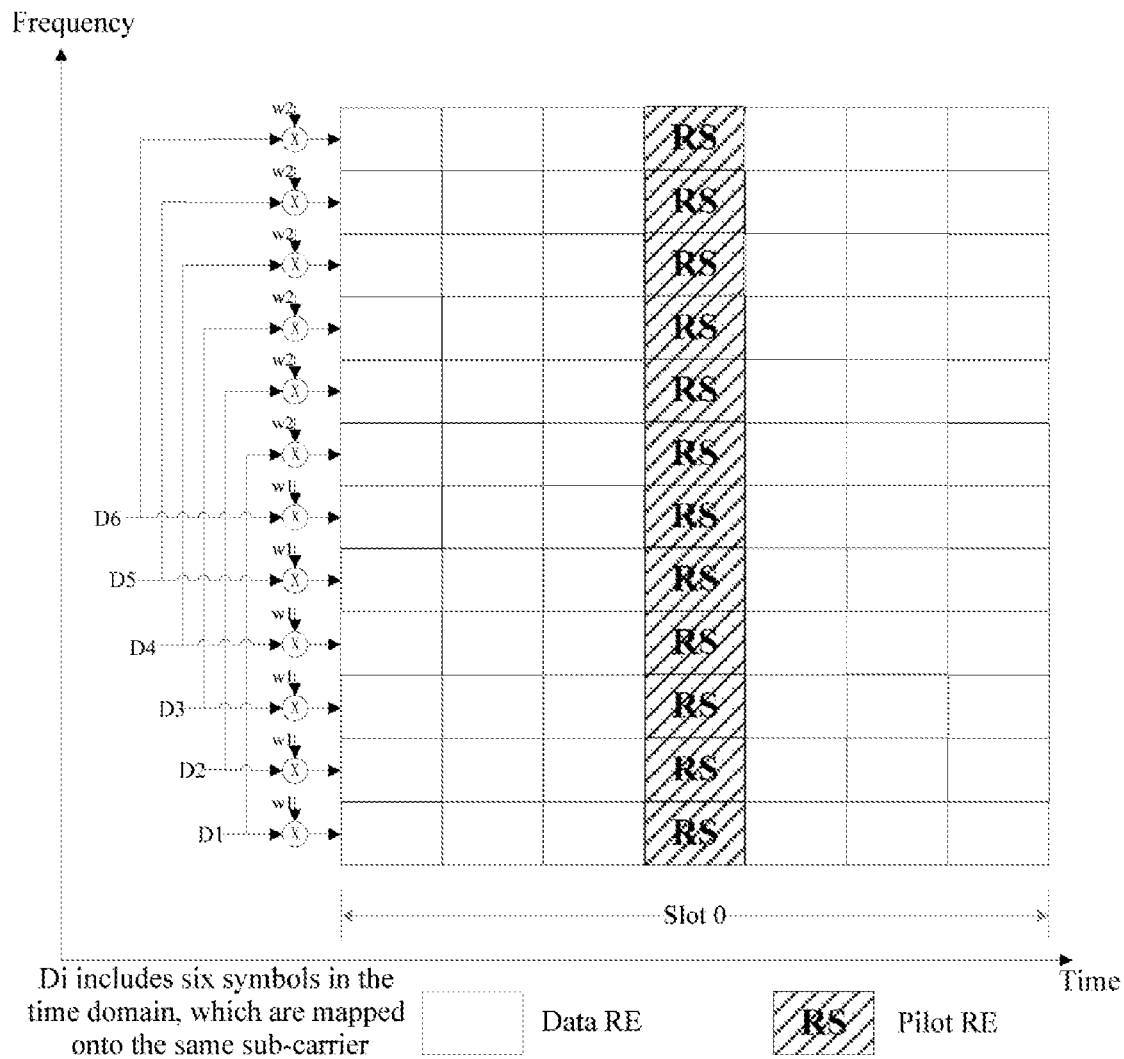

As illustrated in FIG. 3b, after such a data symbol in D1 that is transmitted in the first SC-FDMA symbol for carrying data is spread in the frequency domain using a length factor of 2, the data symbol is mapped onto {RE0, RE6} in the first SC-FDMA symbol for carrying data; after such a data symbol in D2 that is transmitted in the first SC-FDMA symbol for carrying data is spread in the frequency domain using a length factor of 2, the data symbol is mapped onto {RE1, RE7} in the first SC-FDMA symbol for carrying data; after such a data symbol in D3 that is transmitted in the first SC-FDMA symbol for carrying data is spread in the frequency domain using a length factor of 2, the data symbol is mapped onto {RE2, RE8} in the first SC-FDMA symbol for carrying data; and so on until all the data in the first SC-FDMA symbol for carrying data are spread and then mapped. Alike, after such a data symbol in D1 that is transmitted in the second SC-FDMA symbol for carrying data is spread in the frequency domain using a length factor of 2, the data symbol is mapped onto {RE0, RE6} in the second SC-FDMA symbol for carrying data; after such a data symbol in D2 that is transmitted in the second SC-FDMA symbol for carrying data is spread in the frequency domain using a length factor of 2, the data symbol is mapped onto {RE1, RE7} in the second SC-FDMA symbol for carrying data; after such a data symbol in D3 that is transmitted in the second SC-FDMA symbol for carrying data is spread in the frequency domain using a length factor of 2, the data symbol is mapped onto {RE2, RE8} in the second SC-FDMA symbol for carrying data; and so on until all the data in the second SC-FDMA symbol for carrying data are spread and then mapped. Furthermore this is repeated until all the data in each SC-FDMA symbol for carrying data are spread and then mapped. As can be apparent, two REs, onto which a data symbol is mapped, are discrete in the frequency domain, there is the same interval of six REs in the frequency domain between the two REs, onto which the different data symbols are mapped, and the RE groups, onto which the different data symbols are mapped, are distributed alternately in the frequency domain.

As illustrated in FIG. 3b, in another implementation, for each SC-FDMA symbol used for carrying data, occupied by a PUCCH, a data symbol transmitted in the SC-FDMA symbol is multiplied with a corresponding orthogonal code in an orthogonal sequence, and mapped onto corresponding REs in the SC-FDMA symbol. When one SC-FDMA symbol for carrying data is transmitted in one Resource Block (RB) (including 12 sub-carriers) in the frequency domain, the entire orthogonal sequence thereof in the frequency domain can be represented as an orthogonal sequence [w1, w1, w1, w1, w1, w1, w2, w2, w2, w2, w2, w2] with the length of 12, that is, corresponding orthogonal codes in respective REs are arranged in an order of ascending sub-carriers, or an order of ascending frequencies of frequency resources in an RB. As depicted in Table 2, when an orthogonal sequence with the length of $N_{SF}^{PUCCH}$=2 is [+1, +1], that is, w1=+1, and w2=+1, the orthogonal sequence above with the length of 12 can be represented as [+1, +1, +1, +1, +1, +1, +1, +1, +1, +1, +1, +1]; and when an orthogonal sequence with the length of $N_{SF}^{PUCCH}$=2 is [+1, −1], that is, w1=+1, and w2=−1, the orthogonal sequence above with the length of 12 can be represented as [+1, +1, +1, +1, +1, +1, −1, −1, −1, −1, −1, −1], so when spreading and transmitting in the frequency domain is performed using an orthogonal sequence with the length of $N_{SF}^{PUCCH}=2$, the orthogonal sequence can be further defined as depicted in Table 5 below, where $n_{oc}$ represents an index of the orthogonal sequence, and $N_{sc}^{RB}$ represents the number of sub-carriers in an RB, e.g., 12. Here the i-th (i is a positive integer) one of six data symbols transmitted in an SC-FDMA symbol is multiplied with the i-th and the (i+6)-th orthogonal codes in a corresponding orthogonal sequence, and mapped respectively onto the i-th and the (i+6)-th REs in the SC-FDMA symbol.

TABLE 5

| | Orthogonal sequence |
|---|---|
| Orthogonal sequence index $n_{oc}$ | Orthogonal sequences $[w_{n_{oc}}(0) \ldots w_{n_{oc}}(N_{sc}^{RB}-1)]$ |
| 0 | [+1, +1, +1, +1, +1, +1, +1, +1, +1, +1, +1, +1] |
| 1 | [+1, +1, +1, +1, +1, +1, −1, −1, −1, −1, −1, −1] |

Figure 3C:
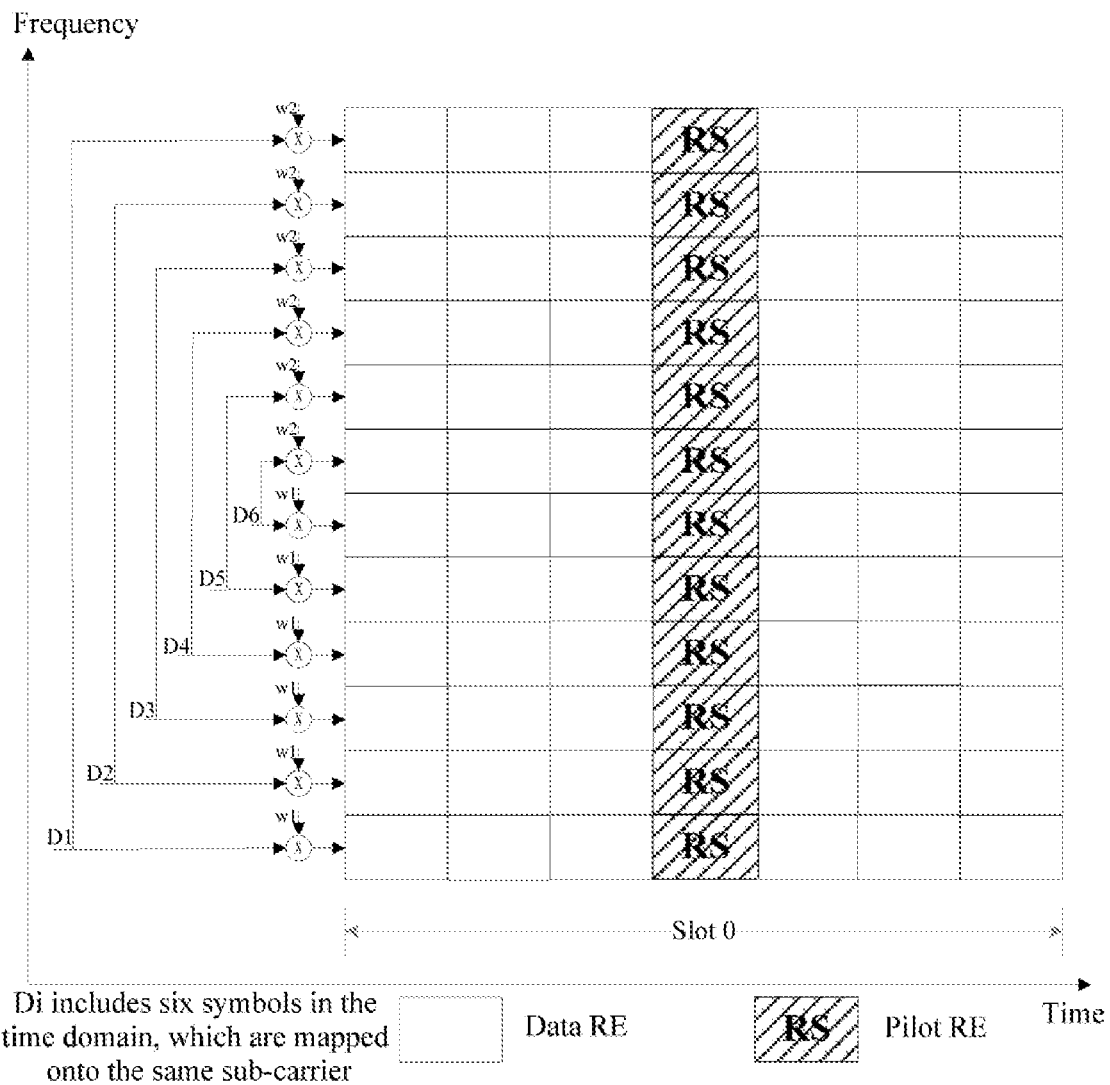

As illustrated in FIG. 3c, after such a data symbol in D1 that is transmitted in the first SC-FDMA symbol for carrying data is spread in the frequency domain using a length factor of 2, the data symbol is mapped onto {RE0, RE11} in the first SC-FDMA symbol for carrying data; after such a data symbol in D2 that is transmitted in the first SC-FDMA symbol for carrying data is spread in the frequency domain using a length factor of 2, the data symbol is mapped onto {RE1, RE10} in the first SC-FDMA symbol for carrying data; after such a data symbol in D3 that is transmitted in the first SC-FDMA symbol for carrying data is spread in the frequency domain using a length factor of 2, the data symbol is mapped onto {RE2, RE9} in the first SC-FDMA symbol for carrying data; and so on until all the data in the first SC-FDMA symbol for carrying data are spread and then mapped. Alike, after such a data symbol in D1 that is transmitted in the second SC-FDMA symbol for carrying data is spread in the frequency domain using a length factor of 2, the data symbol is mapped onto {RE0, RE11} in the second SC-FDMA symbol for carrying data; after such a data symbol in D2 that is transmitted in the second SC-FDMA symbol for carrying data is spread in the frequency domain using a length factor of 2, the data symbol is mapped onto {RE1, RE10} in the second SC-FDMA symbol for carrying data; after such a data symbol in D3 that is transmitted in the second SC-FDMA symbol for carrying data is spread in the frequency domain using a length factor of 2, the data symbol is mapped onto {RE2, RE9} in the second SC-FDMA symbol for carrying data; and so on until all the data in the second SC-FDMA symbol for carrying data are spread and then mapped. Furthermore this is repeated until all the data in each SC-FDMA symbol for carrying data are spread and then mapped. As can be apparent, two REs, onto which a data symbol is mapped, are discrete in the frequency domain, there is a varying interval in the frequency domain between the two REs, onto which the different data symbols are mapped, and the RE groups, onto which the different data symbols are mapped, are distributed alternately in the frequency domain.

A second scenario relates to an example of spreading in the frequency domain with $N_{SF}^{PUCCH}=3$.

This example illustrates mapping in one PRB, where 12 sub-carriers are occupied in the frequency domain and one slot is occupied in the time domain by the PRB. Taking a normal CP which is a guard interval as an example, there are 7 SC-FDMA symbols in one slot, and there is only one column of pilot symbols in one slot. For the sake of a convenient description, REs in an SC-FDMA symbol in the PRB will be referred to as RE0 to RE11 in an order of ascending frequencies.

In this example, 4 data symbol groups (denoted by D1 to D4 as illustrated) of a PUCCH are spread in the frequency domain using orthogonal sequences [w1, w2, w3] respectively, and the spread data symbols are mapped onto resources, where each data symbol group Di includes 6 data symbols transmitted respectively in 6 SC-FDMA symbols, for carrying data, in a slot, and if each data symbol $d_{i,l}$ in each data symbol group Di corresponds to a different orthogonal sequence, then each $d_{i,l}$ may be spread in the frequency domain using the orthogonal sequence corresponding to $d_{i,l}$ respectively, and the spread data may be mapped onto corresponding REs in the SC-FDMA symbol corresponding to $d_{i,l}$, where $d_{i,l}$ represents such a data symbol in Di that is transmitted correspondingly in an SC-FDMA symbol with an SC-FDMA symbol index of l.

Figure 4A:
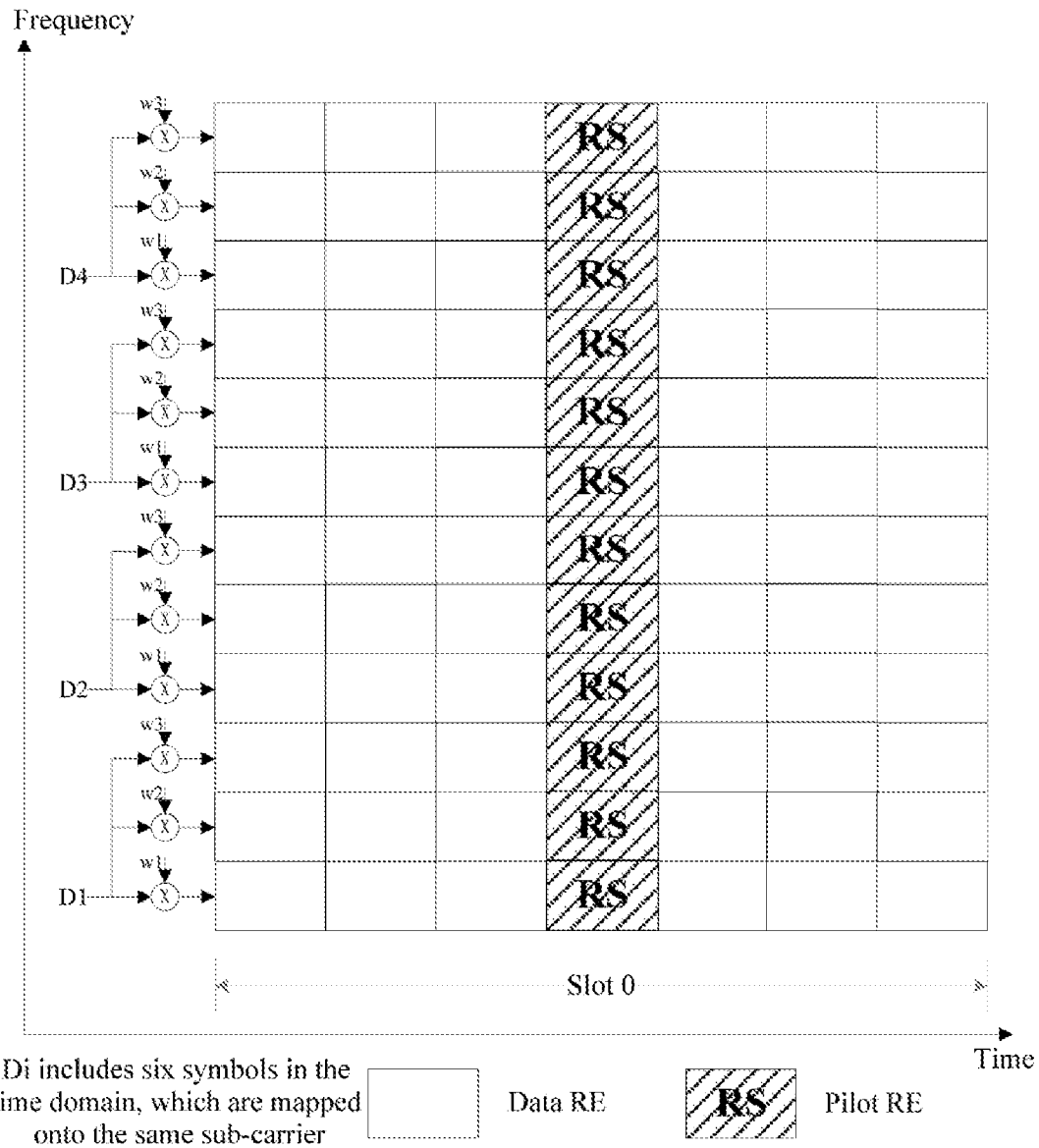
FIG. 4a to FIG. 4b are schematic diagrams of spreading and mapping in the frequency domain in a second scenario according to an embodiment of the disclosure.

As illustrated in FIG. 4a, after such a data symbol in D1 that is transmitted in the first SC-FDMA symbol for carrying data is spread in the frequency domain using a length factor of 3, the data symbol is mapped onto {RE0, RE1, RE2} in the first SC-FDMA symbol for carrying data; after such a data symbol in D2 that is transmitted in the first SC-FDMA symbol for carrying data is spread in the frequency domain using a length factor of 3, the data symbol is mapped onto {RE3, RE4, RE5} in the first SC-FDMA symbol for carrying data; after such a data symbol in D3 that is transmitted in the first SC-FDMA symbol for carrying data is spread in the frequency domain using a length factor of 3, the data symbol is mapped onto {RE6, RE7, RE8} in the first SC-FDMA symbol for carrying data; and so on until all the data in the first SC-FDMA symbol for carrying data are spread and then mapped. Alike, after such a data symbol in D1 that is transmitted in the second SC-FDMA symbol for carrying data is spread in the frequency domain using a length factor of 3, the data symbol is mapped onto {RE0, RE1, RE2} in the second SC-FDMA symbol for carrying data; after such a data symbol in D2 that is transmitted in the second SC-FDMA symbol for carrying data is spread in the frequency domain using a length factor of 3, the data symbol is mapped onto {RE3, RE4, RE5} in the second SC-FDMA symbol for carrying data; after such a data symbol in D3 that is transmitted in the second SC-FDMA symbol for carrying data is spread in the frequency domain using a length factor of 3, the data symbol is mapped onto {RE6, RE7, RE8} in the second SC-FDMA symbol for carrying data; and so on until all the data in the second SC-FDMA symbol for carrying data are spread and then mapped. Furthermore this is repeated until all the data in each SC-FDMA symbol for carrying data are spread and then mapped. As can be apparent, three REs, onto which a data symbol is mapped, are consecutive in the frequency domain, and the RE groups, onto which the different data symbols are mapped, are not distributed alternately in the frequency domain (that is, they are distributed in parallel).

Figure 4B:
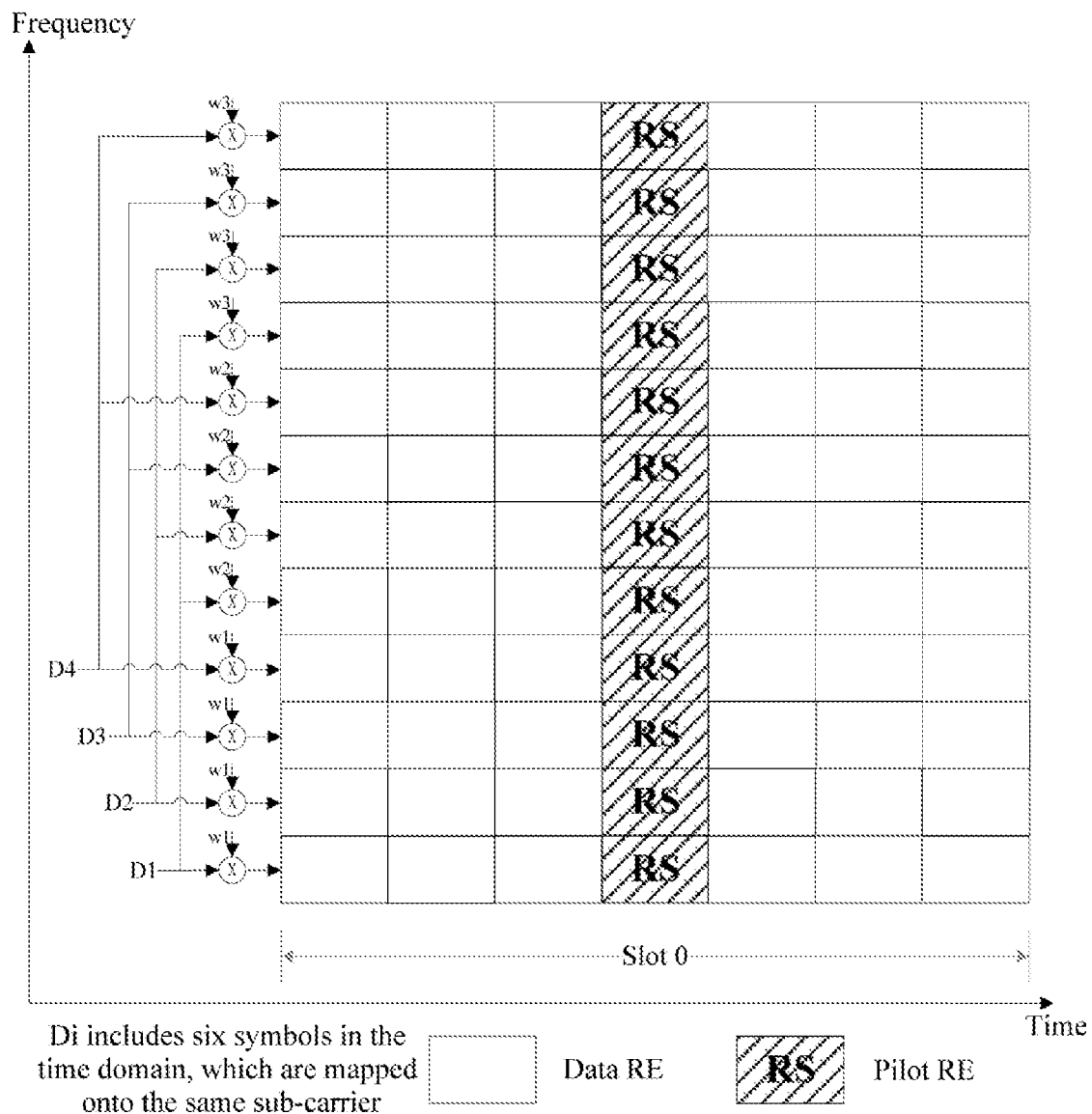

As illustrated in FIG. 4b, after such a data symbol in D1 that is transmitted in the first SC-FDMA symbol for carrying data is spread in the frequency domain using a length factor of 3, the data symbol is mapped onto {RE0, RE4, RE8} in the first SC-FDMA symbol for carrying data; after such a data symbol in D2 that is transmitted in the first SC-FDMA symbol for carrying data is spread in the frequency domain using a length factor of 3, the data symbol is mapped onto {RE1, RE5, RE9} in the first SC-FDMA symbol for carrying data; after such a data symbol in D3 that is transmitted in the first SC-FDMA symbol for carrying data is spread in the frequency domain using a length factor of 3, the data symbol is mapped onto {RE2, RE6, RE10} in the first SC-FDMA symbol for carrying data; and so on until all the data in the first SC-FDMA symbol for carrying data are spread and then mapped. Alike, after such a data symbol in D1 that is transmitted in the second SC-FDMA symbol for carrying data is spread in the frequency domain using a length factor of 3, the data symbol is mapped onto {RE0, RE4, RE8} in the second SC-FDMA symbol for carrying data; after such a data symbol in D2 that is transmitted in the second SC-FDMA symbol for carrying data is spread in the frequency domain using a length factor of 3, the data symbol is mapped onto {RE1, RE5, RE9} in the second SC-FDMA symbol for carrying data; after such a data symbol in D3 that is transmitted in the second SC-FDMA symbol for carrying data is spread in the frequency domain using a length factor of 3, the data symbol is mapped onto {RE2, RE6, RE10} in the second SC-FDMA symbol for carrying data; and so on until all the data in the second SC-FDMA symbol for carrying data are spread and then mapped. Furthermore this is repeated until all the data in each SC-FDMA symbol for carrying data are spread and then mapped. As can be apparent, three REs, onto which a data symbol is mapped, are discrete in the frequency domain, there is the same interval of four REs in the frequency domain between two adjacent ones of the three REs, onto which each data symbol is mapped, and the RE groups, onto which the different data symbols are mapped, are distributed alternately in the frequency domain.

A third scenario relates to an example of spreading in the frequency domain with $N_{SF}^{PUCCH}=4$.

This example illustrates mapping in one PRB, where 12 sub-carriers are occupied in the frequency domain and one slot is occupied in the time domain by the PRB. Taking a normal CP which is a guard interval as an example, there are 7 SC-FDMA symbols in one slot, and there is only one column of pilot symbols in one slot. For the sake of a convenient description, REs in an SC-FDMA symbol in the PRB will be referred to as RE0 to RE11 in an order of ascending frequencies.

In this example, 3 data symbol groups (denoted by D1 to D3 as illustrated) of a PUCCH are spread in the frequency domain using orthogonal sequences [w1, w2, w3, w4] respectively, and the spread data symbols are mapped onto resources, where each data symbol group Di includes 6 data symbols transmitted respectively in 6 SC-FDMA symbols, for carrying data, in a slot, and if each data symbol $d_{i,l}$ in each data symbol group Di corresponds to a different orthogonal sequence, then each $d_{i,l}$ may be spread in the frequency domain using the orthogonal sequence corresponding to $d_{i,l}$ respectively, and the spread data may be mapped onto corresponding REs in the SC-FDMA symbol corresponding to $d_{i,l}$, where $d_{i,l}$ represents such a data symbol in Di that is transmitted correspondingly in an SC-FDMA symbol with an SC-FDMA symbol index of l.

Figure 5A:
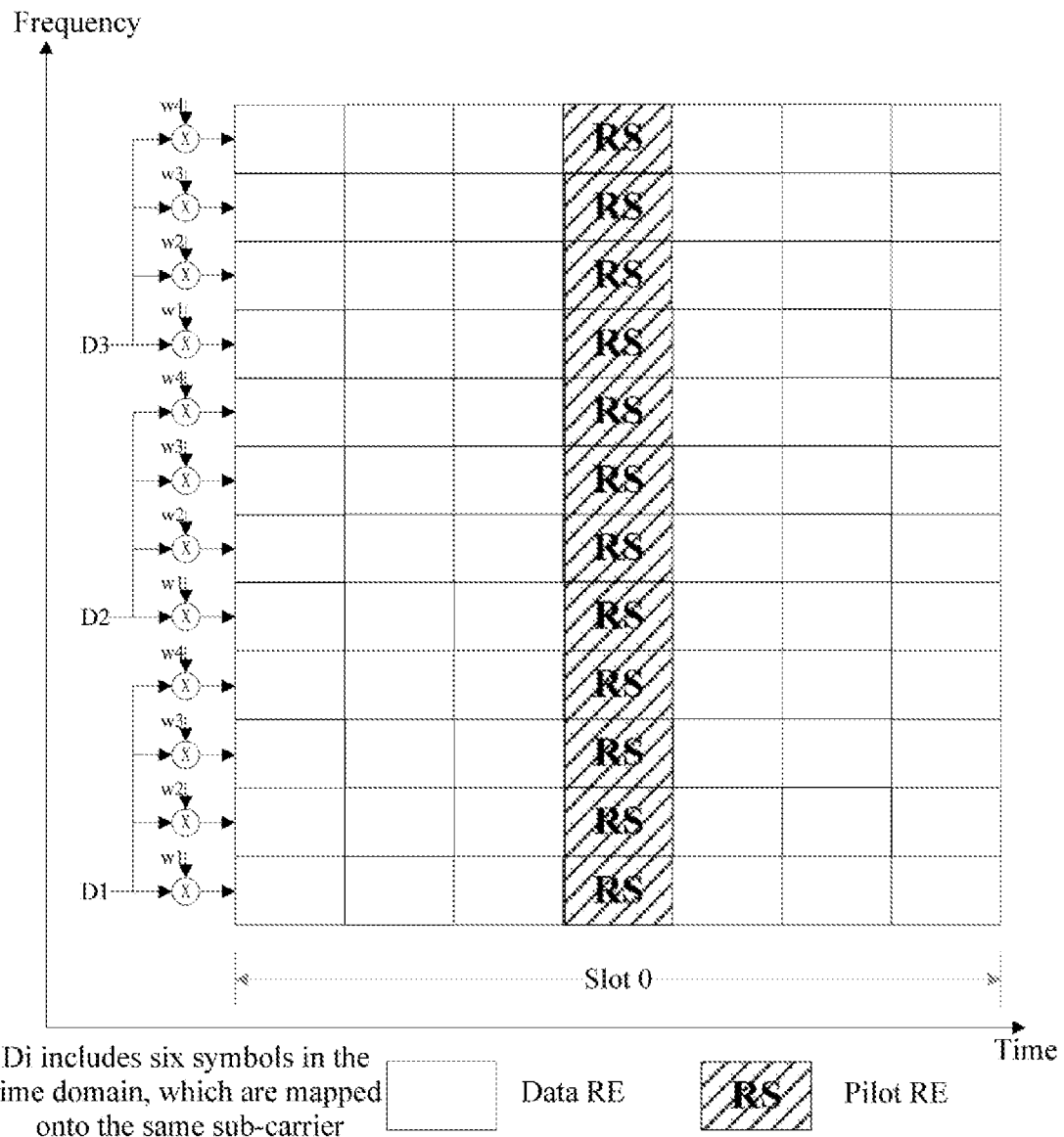
FIG. 5a to FIG. 5d are schematic diagrams of spreading and mapping in the frequency domain in a third scenario according to an embodiment of the disclosure.

As illustrated in FIG. 5a, after such a data symbol in D1 that is transmitted in the first SC-FDMA symbol for carrying data is spread in the frequency domain using a length factor of 4, the data symbol is mapped onto {RE0, RE1, RE2, RE3} in the first SC-FDMA symbol for carrying data; after such a data symbol in D2 that is transmitted in the first SC-FDMA symbol for carrying data is spread in the frequency domain using a length factor of 3, the data symbol is mapped onto {RE4, RE5, RE6, RE7} in the first SC-FDMA symbol for carrying data; and after such a data symbol in D3 that is transmitted in the first SC-FDMA symbol for carrying data is spread in the frequency domain using a length factor of 3, the data symbol is mapped onto {RE8, RE9, RE10, RE11} in the first SC-FDMA symbol for carrying data, so that all the data in the first SC-FDMA symbol for carrying data are spread and then mapped. Alike, after such a data symbol in D1 that is transmitted in the second SC-FDMA symbol for carrying data is spread in the frequency domain using a length factor of 4, the data symbol is mapped onto {RE0, RE1, RE2, RE3} in the second SC-FDMA symbol for carrying data; after such a data symbol in D2 that is transmitted in the second SC-FDMA symbol for carrying data is spread in the frequency domain using a length factor of 4, the data symbol is mapped onto {RE4, RE5, RE6, RE7} in the second SC-FDMA symbol for carrying data; and after such a data symbol in D3 that is transmitted in the second SC-FDMA symbol for carrying data is spread in the frequency domain using a length factor of 4, the data symbol is mapped onto {RE8, RE9, RE10, RE11} in the second SC-FDMA symbol for carrying data, so that all the data in the second SC-FDMA symbol for carrying data are spread and then mapped. Furthermore this is repeated until all the data in each SC-FDMA symbol for carrying data are spread and then mapped. As can be apparent, four REs, onto which a data symbol is mapped, are consecutive in the frequency domain, and the RE groups, onto which the different data symbols are mapped, are not distributed alternately in the frequency domain (that is, they are distributed in parallel).

Figure 5B:
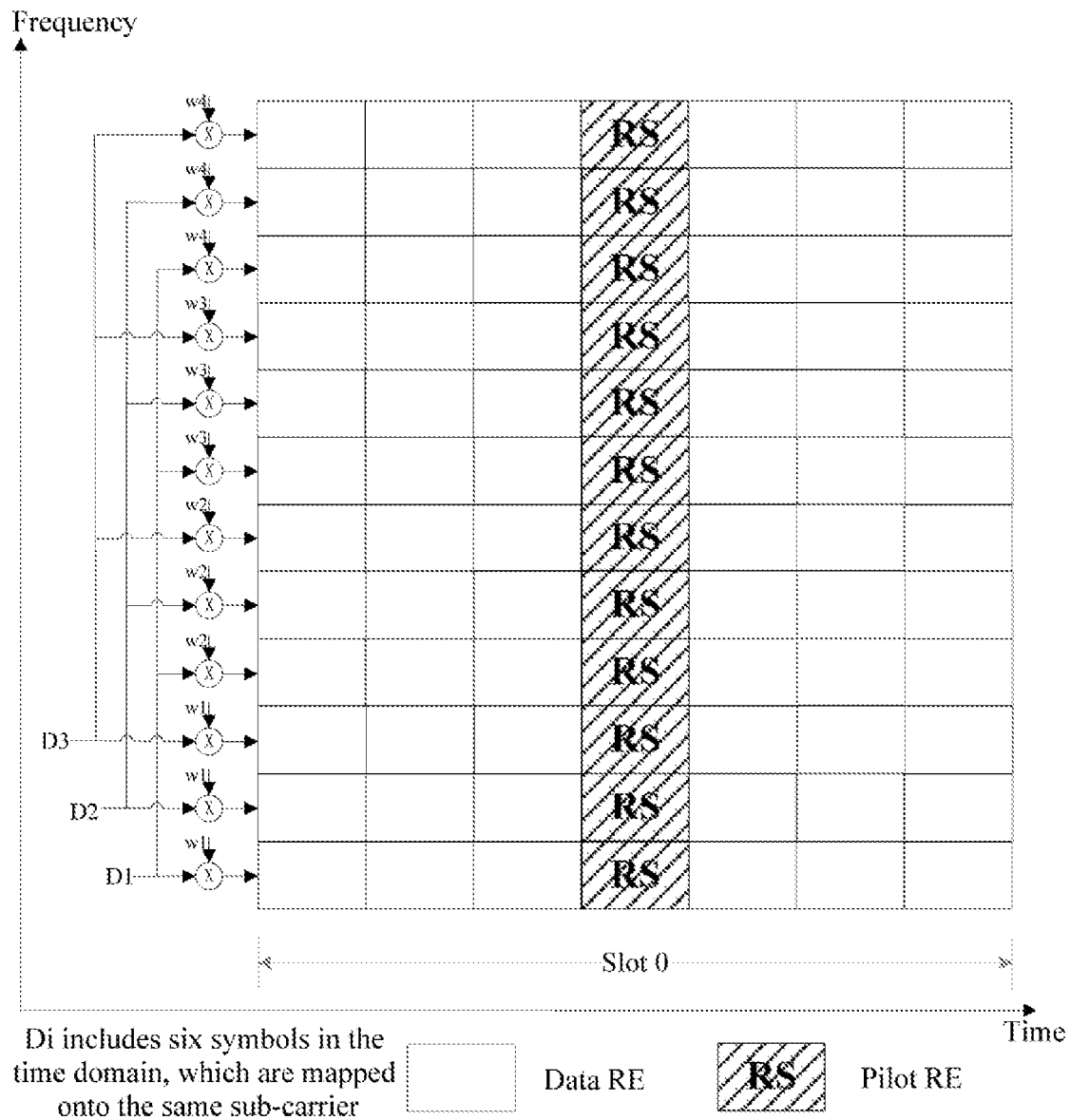

As illustrated in FIG. 5b, after such a data symbol in D1 that is transmitted in the first SC-FDMA symbol for carrying data is spread in the frequency domain using a length factor of 4, the data symbol is mapped onto {RE0, RE3, RE6, RE9} in the first SC-FDMA symbol for carrying data; after such a data symbol in D2 that is transmitted in the first SC-FDMA symbol for carrying data is spread in the frequency domain using a length factor of 4, the data symbol is mapped onto {RE1, RE5, RE7, RE10} in the first SC-FDMA symbol for carrying data; and after such a data symbol in D3 that is transmitted in the first SC-FDMA symbol for carrying data is spread in the frequency domain using a length factor of 4, the data symbol is mapped onto {RE2, RE5, RE8, RE11} in the first SC-FDMA symbol for carrying data, so that all the data in the first SC-FDMA symbol for carrying data are spread and then mapped. Alike, after such a data symbol in D1 that is transmitted in the second SC-FDMA symbol for carrying data is spread in the frequency domain using a length factor of 4, the data symbol is mapped onto {RE0, RE3, RE6, RE9} in the second SC-FDMA symbol for carrying data; after such a data symbol in D2 that is transmitted in the second SC-FDMA symbol for carrying data is spread in the frequency domain using a length factor of 4, the data symbol is mapped onto {RE1, RE5, RE7, RE10} in the second SC-FDMA symbol for carrying data; and after such a data symbol in D3 that is transmitted in the second SC-FDMA symbol for carrying data is spread in the frequency domain using a length factor of 4, the data symbol is mapped onto {RE2, RE5, RE8, RE11} in the second SC-FDMA symbol for carrying data, so that all the data in the second SC-FDMA symbol for carrying data are spread and then mapped. Furthermore this is repeated until all the data in each SC-FDMA symbol for carrying data are spread and then mapped. As can be apparent, four REs, onto which a data symbol is mapped, are discrete in the frequency domain, there is the same interval of 3 REs in the frequency domain between two adjacent ones of the four REs, onto which each data symbol is mapped, and the RE groups, onto which the different data symbols are mapped, are distributed alternately in the frequency domain.

Figure 5C:
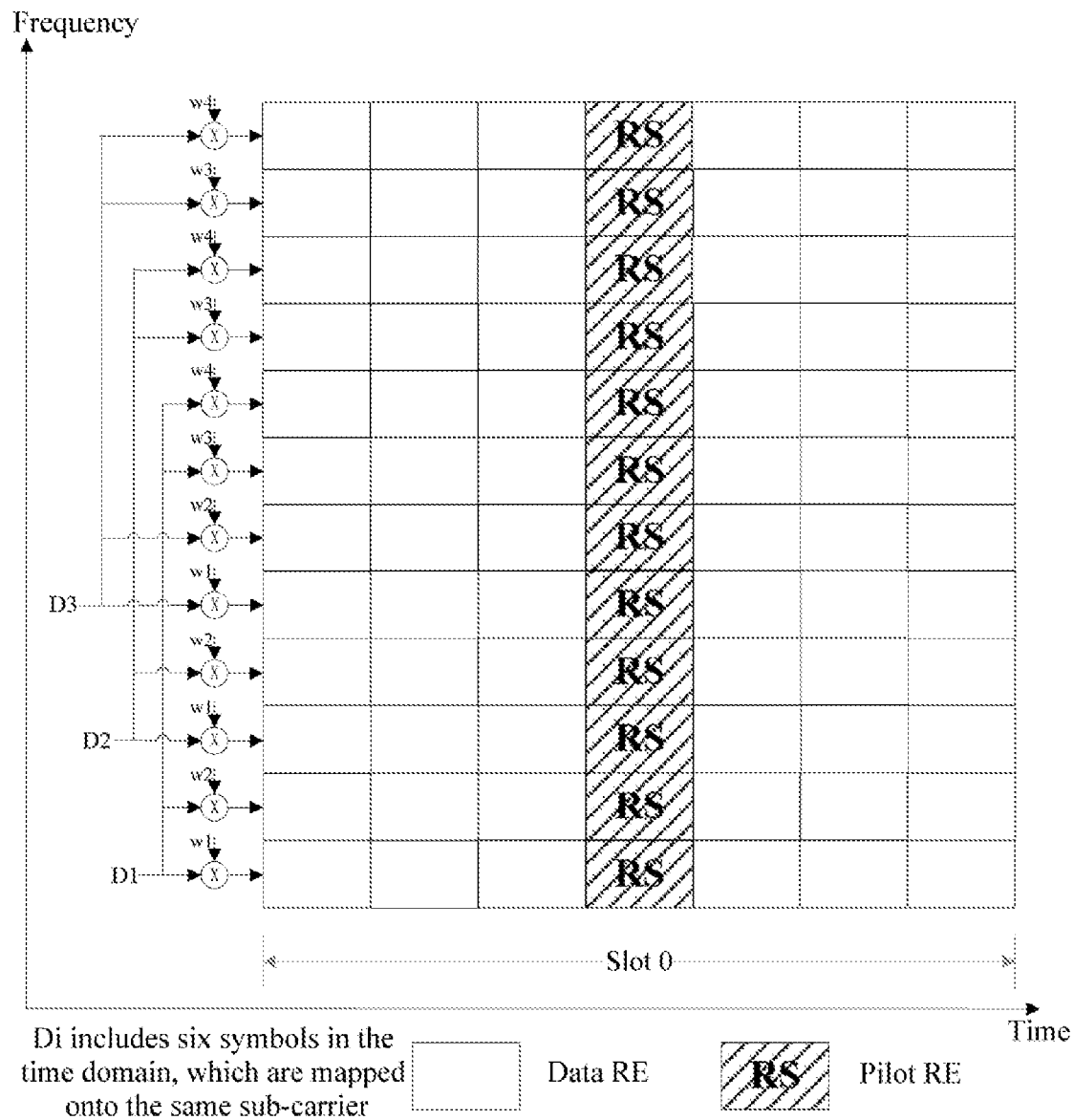

As illustrated in FIG. 5c, after such a data symbol in D1 that is transmitted in the first SC-FDMA symbol for carrying data is spread in the frequency domain using a length factor of 4, the data symbol is mapped onto {RE0, RE1, RE6, RE7} in the first SC-FDMA symbol for carrying data; after such a data symbol in D2 that is transmitted in the first SC-FDMA symbol for carrying data is spread in the frequency domain using a length factor of 4, the data symbol is mapped onto {RE2, RE3, RE8, RE9} in the first SC-FDMA symbol for carrying data; and after such a data symbol in D3 that is transmitted in the first SC-FDMA symbol for carrying data is spread in the frequency domain using a length factor of 4, the data symbol is mapped onto {RE4, RE5, RE10, RE11} in the first SC-FDMA symbol for carrying data, so that all the data in the first SC-FDMA symbol for carrying data are spread and then mapped. Alike, after such a data symbol in D1 that is transmitted in the second SC-FDMA symbol for carrying data is spread in the frequency domain using a length factor of 4, the data symbol is mapped onto {RE0, RE1, RE6, RE7} in the second SC-FDMA symbol for carrying data; after such a data symbol in D2 that is transmitted in the second SC-FDMA symbol for carrying data is spread in the frequency domain using a length factor of 4, the data symbol is mapped onto {RE2, RE3, RE8, RE9} in the second SC-FDMA symbol for carrying data; and after such a data symbol in D3 that is transmitted in the second SC-FDMA symbol for carrying data is spread in the frequency domain using a length factor of 4, the data symbol is mapped onto {RE4, RE5, RE10, RE11} in the second SC-FDMA symbol for carrying data, so that all the data in the second SC-FDMA symbol for carrying data are spread and then mapped. Furthermore this is repeated until all the data in each SC-FDMA symbol for carrying data are spread and then mapped. As can be apparent, four REs, onto which a data symbol is mapped, are discrete in the frequency domain, there is a varying interval in the frequency domain between two adjacent ones of the four REs, onto which each data symbol is mapped, and the RE groups, onto which the different data symbols are mapped, are distributed alternately in the frequency domain.

Figure 5D:
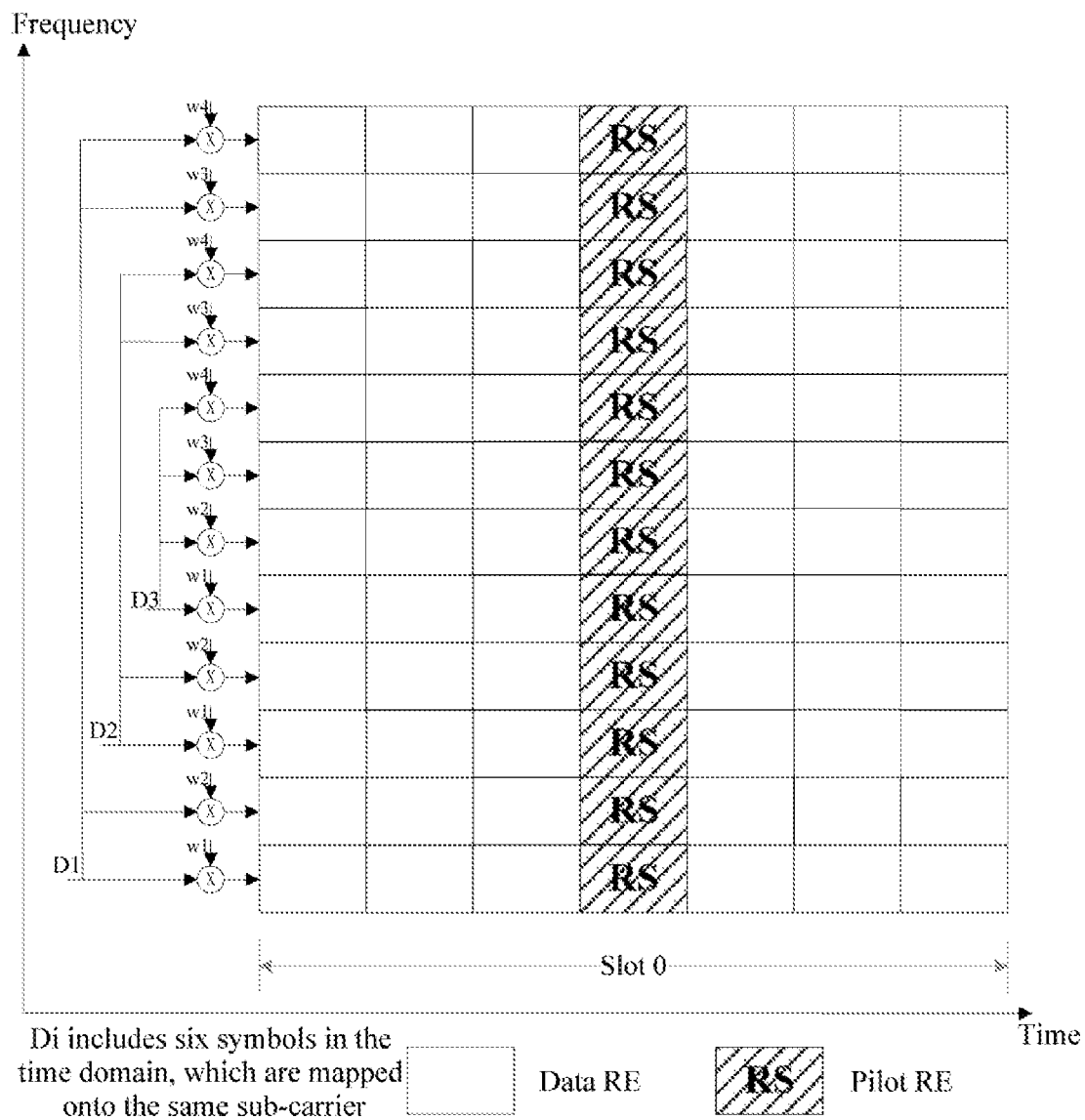

As illustrated in FIG. 5d, after such a data symbol in D1 that is transmitted in the first SC-FDMA symbol for carrying data is spread in the frequency domain using a length factor of 4, the data symbol is mapped onto {RE0, RE1, RE10, RE11} in the first SC-FDMA symbol for carrying data; after such a data symbol in D2 that is transmitted in the first SC-FDMA symbol for carrying data is spread in the frequency domain using a length factor of 4, the data symbol is mapped onto {RE2, RE3, RE8, RE9} in the first SC-FDMA symbol for carrying data; and after such a data symbol in D3 that is transmitted in the first SC-FDMA symbol for carrying data is spread in the frequency domain using a length factor of 4, the data symbol is mapped onto {RE4, RE5, RE6, RE7} in the first SC-FDMA symbol for carrying data, so that all the data in the first SC-FDMA symbol for carrying data are spread and then mapped. Alike, after such a data symbol in D1 that is transmitted in the second SC-FDMA symbol for carrying data is spread in the frequency domain using a length factor of 4, the data symbol is mapped onto {RE0, RE1, RE10, RE11} in the second SC-FDMA symbol for carrying data; after such a data symbol in D2 that is transmitted in the second SC-FDMA symbol for carrying data is spread in the frequency domain using a length factor of 4, the data symbol is mapped onto {RE2, RE3, RE8, RE9} in the second SC-FDMA symbol for carrying data; and after such a data symbol in D3 that is transmitted in the second SC-FDMA symbol for carrying data is spread in the frequency domain using a length factor of 4, the data symbol is mapped onto {RE4, RE5, RE6, RE7} in the second SC-FDMA symbol for carrying data, so that all the data in the second SC-FDMA symbol for carrying data are spread and then mapped. Furthermore this is repeated until all the data in each SC-FDMA symbol for carrying data are spread and then mapped. As can be apparent, four REs, onto which a data symbol is mapped, may be discrete or consecutive in the frequency domain, and the RE groups, onto which the different data symbols are mapped, are distributed alternately in the frequency domain.

A fourth scenario relates to an example of spreading in the frequency domain with $N_{SF}^{PUCCH}=6$.

This example illustrates mapping in one PRB, where 12 sub-carriers are occupied in the frequency domain and one slot is occupied in the time domain by the PRB. Taking a normal CP which is a guard interval as an example, there are 7 SC-FDMA symbols in one slot, and there is only one column of pilot symbols in one slot. For the sake of a convenient description, REs in an SC-FDMA symbol in the PRB will be referred to as RE0 to RE11 in an order of ascending frequencies.

In this example, 2 data symbol groups (denoted by D1 to D2 as illustrated) of a PUCCH are spread in the frequency domain using orthogonal sequences [w1, w2, w3, w4, w5, w6] respectively, and the spread data symbols are mapped onto resources, where each data symbol group Di includes six data symbols transmitted respectively in 6 SC-FDMA symbols, for carrying data, in a slot, and if each data symbol $d_{i,l}$ in each data symbol group Di corresponds to a different orthogonal sequence, then each $d_{i,l}$ may be spread in the frequency domain using the orthogonal sequence corresponding to $d_{i,l}$ respectively, and the spread data may be mapped onto corresponding REs in the SC-FDMA symbol corresponding to $d_{i,l}$, where $d_{i,l}$ represents such a data symbol in Di that is transmitted correspondingly in an SC-FDMA symbol with an SC-FDMA symbol index of l.

Figure 6A:
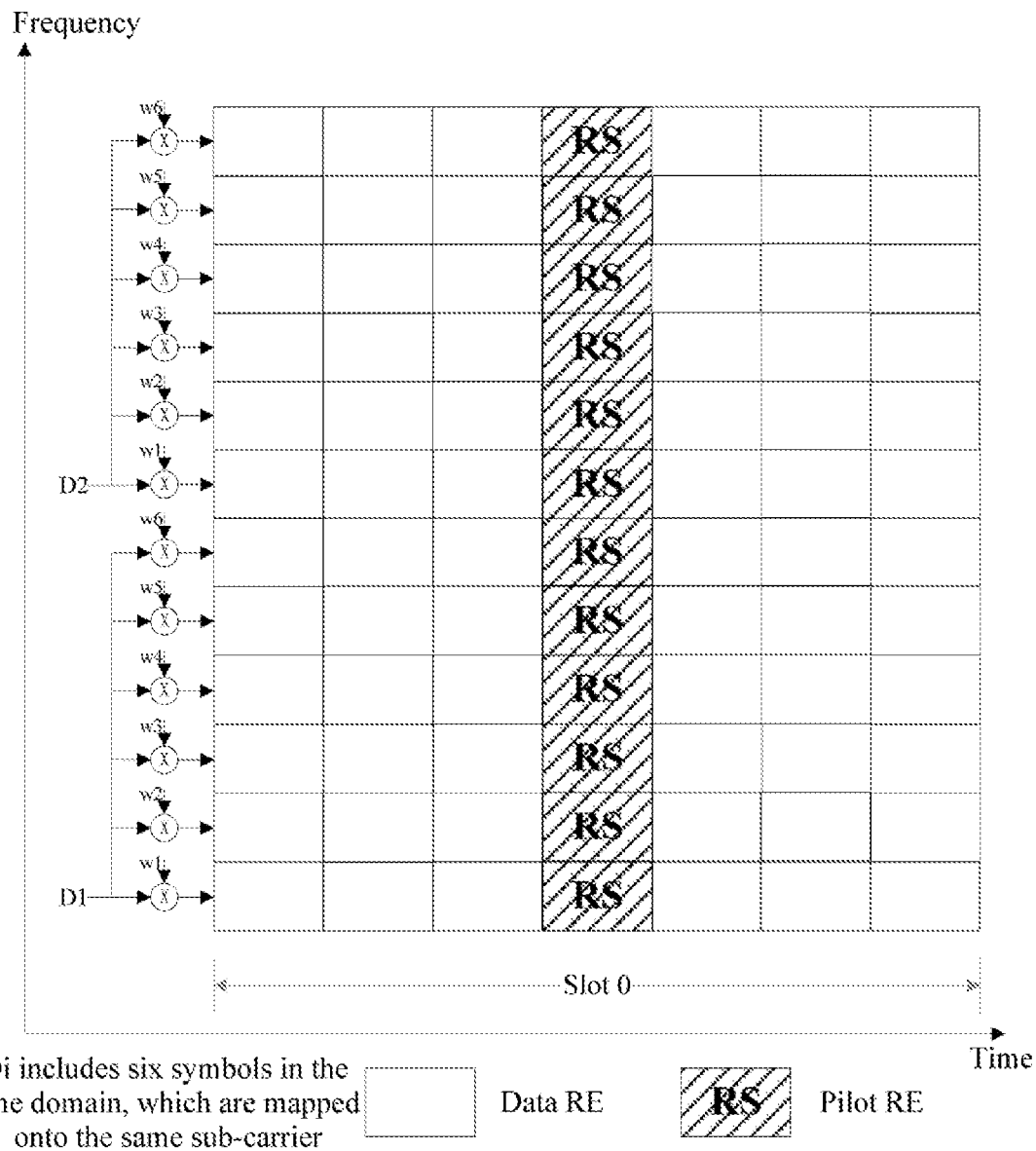
FIG. 6a to FIG. 6d are schematic diagrams of spreading and mapping in the frequency domain in a fourth scenario according to an embodiment of the disclosure.

As illustrated in FIG. 6a, after such a data symbol in D1 that is transmitted in the first SC-FDMA symbol for carrying data is spread in the frequency domain using a length factor of 6, the data symbol is mapped onto {RE0, RE1, RE2, RE3, RE4, RE5} in the first SC-FDMA symbol for carrying data; and after such a data symbol in D2 that is transmitted in the first SC-FDMA symbol for carrying data is spread in the frequency domain using a length factor of 6, the data symbol is mapped onto {RE6, RE7, RE8, RE9, RE10, RE11} in the first SC-FDMA symbol for carrying data, so that all the data in the first SC-FDMA symbol for carrying data are spread and then mapped. Alike, after such a data symbol in D1 that is transmitted in the second SC-FDMA symbol for carrying data is spread in the frequency domain using a length factor of 6, the data symbol is mapped onto {RE0, RE1, RE2, RE3, RE4, RE5} in the second SC-FDMA symbol for carrying data; and after such a data symbol in D2 that is transmitted in the second SC-FDMA symbol for carrying data is spread in the frequency domain using a length factor of 6, the data symbol is mapped onto {RE6, RE7, RE8, RE9, RE10, RE11} in the second SC-FDMA symbol for carrying data, so that all the data in the second SC-FDMA symbol for carrying data are spread and then mapped. Furthermore this is repeated until all the data in each SC-FDMA symbol for carrying data are spread and then mapped. As can be apparent, six REs, onto which a data symbol is mapped, are consecutive in the frequency domain, and the RE groups, onto which the different data symbols are mapped, are not distributed alternately in the frequency domain (that is, they are distributed in parallel).

Figure 6B:
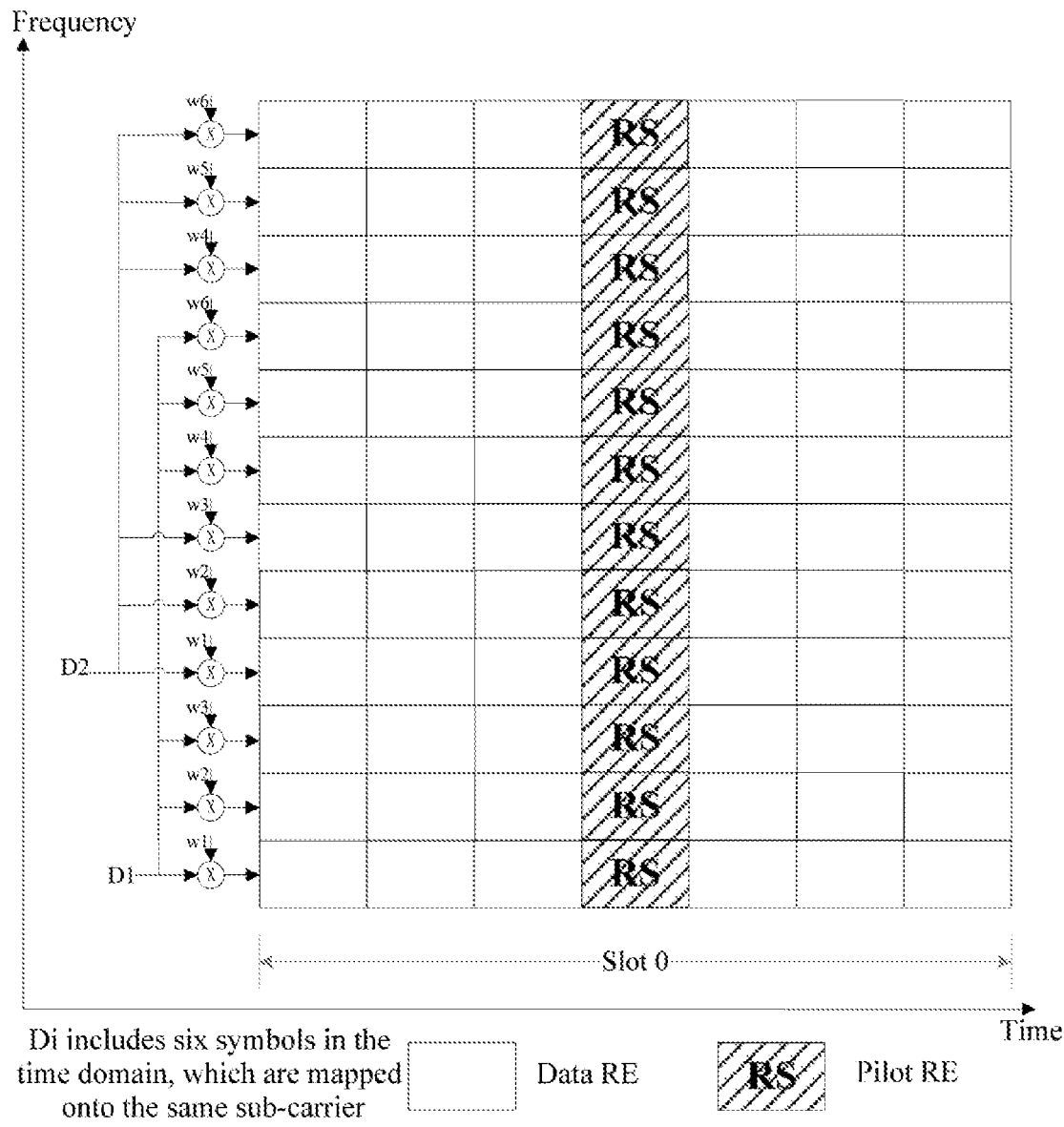

As illustrated in FIG. 6b, after such a data symbol in D1 that is transmitted in the first SC-FDMA symbol for carrying data is spread in the frequency domain using a length factor of 6, the data symbol is mapped onto {RE0, RE1, RE2, RE6, RE7, RE8} in the first SC-FDMA symbol for carrying data; and after such a data symbol in D2 that is transmitted in the first SC-FDMA symbol for carrying data is spread in the frequency domain using a length factor of 6, the data symbol is mapped onto {RE3, RE4, RE5, RE9, RE10, RE11} in the first SC-FDMA symbol for carrying data, so that all the data in the first SC-FDMA symbol for carrying data are spread and then mapped. Alike, after such a data symbol in D1 that is transmitted in the second SC-FDMA symbol for carrying data is spread in the frequency domain using a length factor of 6, the data symbol is mapped onto {RE0, RE1, RE2, RE6, RE7, RE8} in the second SC-FDMA symbol for carrying data; and after such a data symbol in D2 that is transmitted in the second SC-FDMA symbol for carrying data is spread in the frequency domain using a length factor of 6, the data symbol is mapped onto {RE3, RE4, RE5, RE9, RE10, RE11} in the second SC-FDMA symbol for carrying data, so that all the data in the second SC-FDMA symbol for carrying data are spread and then mapped. Furthermore this is repeated until all the data in each SC-FDMA symbol for carrying data are spread and then mapped. As can be apparent, six REs, onto which a data symbol is mapped, are discrete in the frequency domain, and the RE groups, onto which the different data symbols are mapped, are distributed alternately in the frequency domain.

Figure 6C:
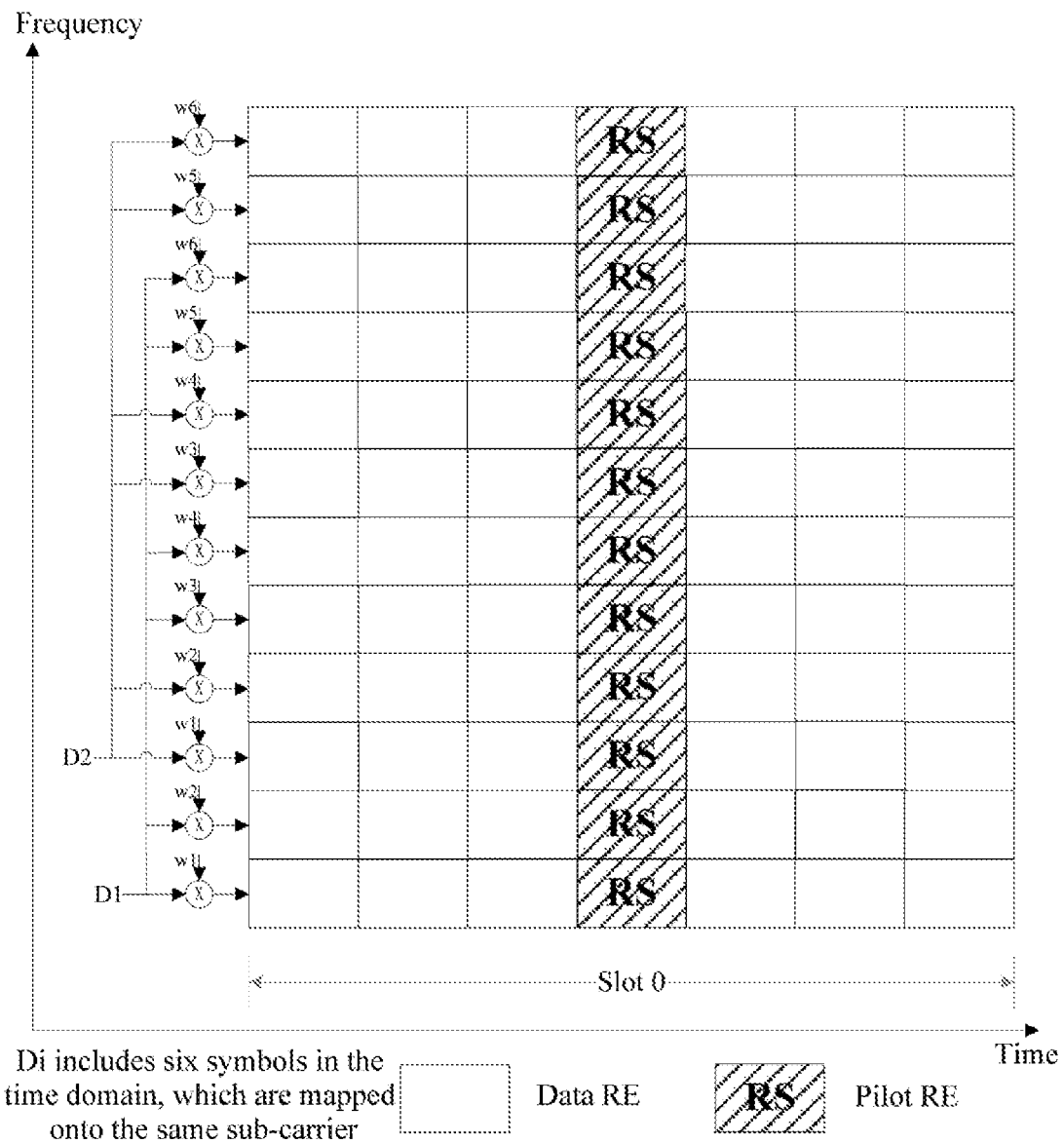

As illustrated in FIG. 6c, after such a data symbol in D1 that is transmitted in the first SC-FDMA symbol for carrying data is spread in the frequency domain using a length factor of 6, the data symbol is mapped onto {RE0, RE1, RE4, RE5, RE8, RE9} in the first SC-FDMA symbol for carrying data; and after such a data symbol in D2 that is transmitted in the first SC-FDMA symbol for carrying data is spread in the frequency domain using a length factor of 6, the data symbol is mapped onto {RE2, RE3, RE6, RE7, RE10, RE11} in the first SC-FDMA symbol for carrying data, so that all the data in the first SC-FDMA symbol for carrying data are spread and then mapped. Alike, after such a data symbol in D1 that is transmitted in the second SC-FDMA symbol for carrying data is spread in the frequency domain using a length factor of 6, the data symbol is mapped onto {RE0, RE1, RE4, RE5, RE8, RE9} in the second SC-FDMA symbol for carrying data; and after such a data symbol in D2 that is transmitted in the second SC-FDMA symbol for carrying data is spread in the frequency domain using a length factor of 6, the data symbol is mapped onto {RE2, RE3, RE6, RE7, RE10, RE11} in the second SC-FDMA symbol for carrying data, so that all the data in the second SC-FDMA symbol for carrying data are spread and then mapped. Furthermore this is repeated until all the data in each SC-FDMA symbol for carrying data are spread and then mapped. As can be apparent, six REs, onto which a data symbol is mapped, are discrete in the frequency domain, and the RE groups, onto which the different data symbols are mapped, are distributed alternately in the frequency domain.

Figure 6D:
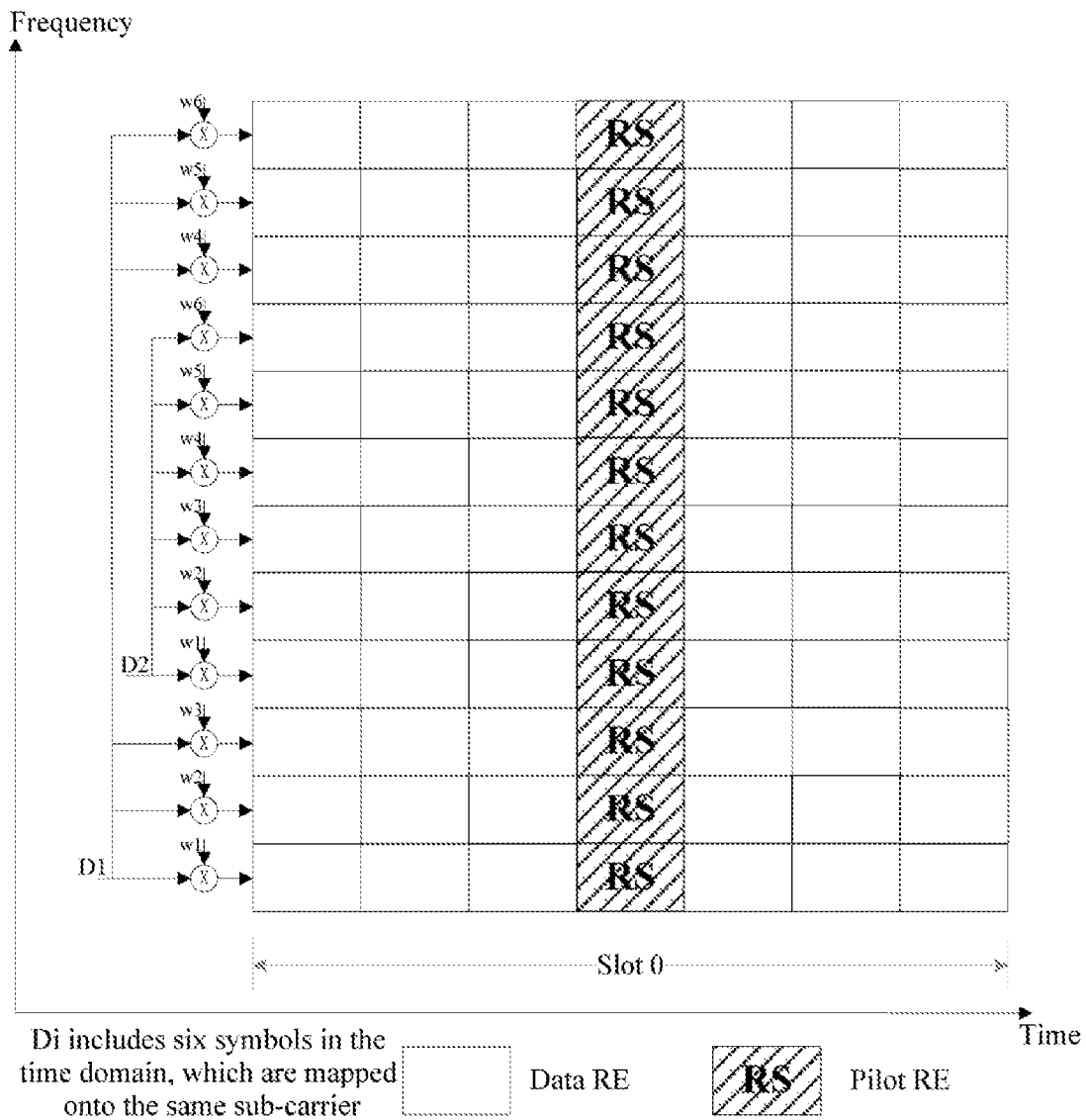

As illustrated in FIG. 6d, after such a data symbol in D1 that is transmitted in the first SC-FDMA symbol for carrying data is spread in the frequency domain using a length factor of 6, the data symbol is mapped onto {RE0, RE1, RE2, RE9, RE10, RE11} in the first SC-FDMA symbol for carrying data; and after such a data symbol in D2 that is transmitted in the first SC-FDMA symbol for carrying data is spread in the frequency domain using a length factor of 6, the data symbol is mapped onto {RE3, RE4, RE5, RE6, RE7, RE8} in the first SC-FDMA symbol for carrying data, so that all the data in the first SC-FDMA symbol for carrying data are spread and then mapped. Alike, after such a data symbol in D1 that is transmitted in the second SC-FDMA symbol for carrying data is spread in the frequency domain using a length factor of 6, the data symbol is mapped onto {RE0, RE1, RE2, RE9, RE10, RE11} in the second SC-FDMA symbol for carrying data; and after such a data symbol in D2 that is transmitted in the second SC-FDMA symbol for carrying data is spread in the frequency domain using a length factor of 6, the data symbol is mapped onto {RE3, RE4, RE5, RE6, RE7, RE8} in the second SC-FDMA symbol for carrying data, so that all the data in the second SC-FDMA symbol for carrying data are spread and then mapped. Furthermore this is repeated until all the data in each SC-FDMA symbol for carrying data are spread and then mapped. As can be apparent, six REs, onto which a data symbol is mapped, may be consecutive or discrete in the frequency domain, and the RE groups, onto which the different data symbols are mapped, are distributed alternately in the frequency domain.

In the first scenario to the fourth scenario above, although only mapping of a PUCCH into one PRB has been described, the same can be applicable to mapping of a PUCCH into a plurality of PRBs. If a PUCCH is mapped into a plurality of PRBs, then there may be the following several results of mapping.

Mapping in each PRB may be the same as mapping above in one PRB, or REs in different PRBs may be considered as a RE group across the PRBs for spreading.

There is no frequency hop across slots, and for example, the position of a second slot (e.g., an even slot) is the same as the position of a first slot (e.g., an odd slot) in the frequency domain in a sub-frame. When there is a frequency hop in the time domain, the second slot and the first slot are located respectively at different positions in the frequency domain.

There may be more than one column of pilots in each slot, that is, there are an altered number of SC-FDMA symbols for carrying data.

With an extended CP, the number of SC-FDMA symbols used for carrying data, in each slot is different from those in the first to fourth scenarios above. For example, when there is only one column of RS's, the number of SC-FDMA symbols, for carrying data, in a slot is 5.

In the step 203, the user equipment transmits the uplink control information after spreading, over frequency resources corresponding to the PUCCH.

In this step, a result of mapping onto the resources in the step 202 can be modulated into a radio frequency signal, and the radio frequency signal can be transmitted, so that the uplink control information after spreading is transmitted over the frequency resources corresponding to the PUCCH.

In some embodiments, the frequency resources corresponding to the PUCCH can be pre-configured via higher-layer signaling. For example, the frequency resources corresponding to the PUCCH are configured via RRC signaling; or the frequency resources corresponding to the PUCCH can be notified in a bit field in downlink control information; or the frequency resources corresponding to the PUCCH can be notified via higher-layer signaling and downlink control information. Particularly the network side can pre-configure the user equipment with the frequency resources corresponding to the PUCCH for frequency domain spreading using an orthogonal sequence with the length of $N_{SF}^{PUCCH}$ via the higher-layer signaling (e.g., RRC signaling), or the network side can notify the frequency resources corresponding to the PUCCH for frequency domain spreading using an orthogonal sequence with the length of $N_{SF}^{PUCCH}$ to the user equipment in a bit field in the DCI, or the network side can pre-configure a frequency resource set including at least two different groups of frequency resources via the higher-layer signaling, and indicate one of the groups of frequency resources to the user equipment in a bit field in the downlink control information. Accordingly the user equipment can determine the frequency resources for transmitting the PUCCH according to the indication information notified as above.

Here the indication information of the frequency resources corresponding to the PUCCH can include one or more of: the number of PRBs, indexes of the PRBs (the indexes of the PRBs can identify the positions of the PRBs in a system bandwidth), and channel resource indexes of the PUCCH. Furthermore if the indication information of the frequency resources corresponding to the PUCCH includes the channel resource indexes of the PUCCH, then the user equipment may determine the indexes of the PRBs corresponding to the PUCCH according to the channel resource indexes of the PUCCH, that is, the indexes of the PRBs corresponding to the PUCCH can be determined according to the channel resource indexes of the PUCCH.

Particularly the indexes of the PRBs are $n_{PRB}$=f $(n_{PUCCH}^{(4)}, N_{SF}^{PUCCH})$, that is, $n_{PRB}$ is determined according to the channel resource index $N_{PUCCH}^{(4)}$ of the new PUCCH format, and the length $N_{SF}^{PUCCH}$ of the orthogonal sequence. For example, when there is a support of PUCCH transmission with frequency hopping, preferably the indexes of the PRBs corresponding to the PUCCH can be determined in the equations of:

$$n_{PRB} = \begin{cases} \lfloor \frac{m}{2} \rfloor + N_{RB-N_{SF}^{PUCCH}} & \text{if } (m+n_s \text{ mod } 2) \text{ mod } 2 = 0 \\ N_{RB}^{UL} - 1 - \lfloor \frac{m}{2} \rfloor - N_{RB-N_{SF}^{PUCCH}} & \text{if } (m+n_s \text{ mod } 2) \text{ mod } 2 = 1 \end{cases} \quad (1)$$

Where $n_{PRB}$ represents the index of a PRB;

$$m = \lfloor \frac{n_{PUCCH}^{(4)}}{N_{SF}^{PUCCH}} \rfloor,$$

and $\lfloor \cdot \rfloor$ represents rounding down; $N_{RB-N_{SF}^{PUCCH}}$ represents a PRB start position (counting from the lower-frequency side) corresponding to a different $N_{SF}^{PUCCH}$, and this value can be pre-configured via higher-layer signaling; $N_{SF}^{PUCCH}$ represents the length of the orthogonal sequence; and $N_{RB}^{UL}$ represents the number of uplink PRBs.

Or, the indexes of the PRBs corresponding to the PUCCH can be determined in the equations of:

$$n_{PRB} = \begin{cases} \lfloor \frac{m}{2} \rfloor & \text{if } (m+n_s \text{ mod } 2) \text{ mod } 2 = 0 \\ N_{RB}^{UL} - 1 - \lfloor \frac{m}{2} \rfloor & \text{if } (m+n_s \text{ mod } 2) \text{ mod } 2 = 1 \end{cases} \quad (2)$$

Where $n_{PRB}$ represents the index of a PRB;

$$m = \lfloor \frac{n_{PUCCH}^{(4)}}{N_{SF}^{PUCCH}} \rfloor,$$

and $\lfloor \cdot \rfloor$ represents rounding down; $N_{SF}^{PUCCH}$ represents the length of the orthogonal sequence; and $N_{RB}^{UL}$ represents the number of uplink PRBs; that is, the currently indicated $N_{PUCCH}^{(4)}$ is considered to be counted from the first PRB, and it is supposed to be $N_{SF}^{PUCCH}$ resources currently in each PRB, so the index of the current PRB can be obtained directly according to the relationship between this value and $N_{SF}^{PUCCH}$.

Figure 7:
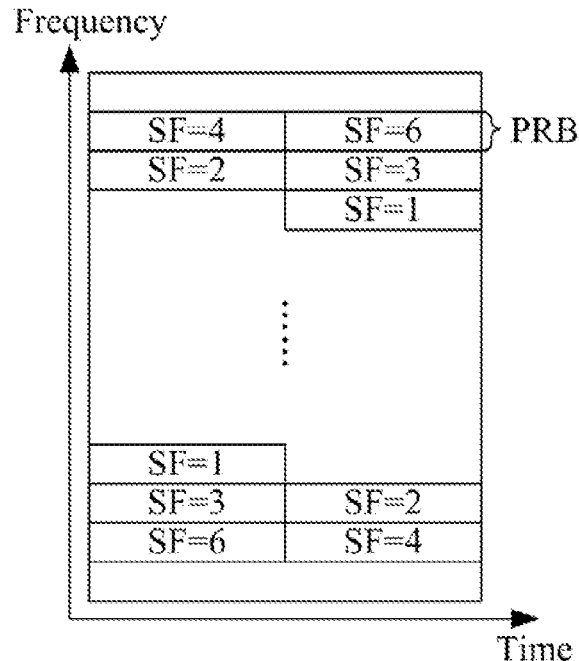
FIG. 7 is a schematic diagram of PUCCH resource allocation according to an embodiment of the disclosure, where orthogonal sequences with different lengths are used for frequency domain spreading.

Preferably PUCCHs spread in the frequency domain using orthogonal sequences with different lengths are configured to be transmitted in different PRBs, or configured to be transmitted in the same PRB in a multiplexed mode, as illustrated in FIG. 7. In FIG. 7, SF represents an orthogonal sequence, and SF=2 represents an orthogonal sequence with the length of 2, and so on. For example, PUCCHs spread in the frequency domain using orthogonal sequences with $N_{SF}^{PUCCH}$=2 and $N_{SF}^{PUCCH}$=4 can be configured to be transmitted in the same PRB in a multiplexed mode because the orthogonal sequence with $N_{SF}^{PUCCH}$=2 is also orthogonal to the orthogonal sequence with $N_{SF}^{PUCCH}$=4. FIG. 7 illustrates a schematic diagram of resources allocated for PUCCHs spread in the frequency domain using orthogonal sequences with different $N_{SF}^{PUCCH}$.

Furthermore, further to the respective embodiments above, the method can further include the steps of: determining a set of candidate cyclic shift values according to a cyclic shift interval $\Delta$, selecting a cyclic shift value from the set, and generating a pilot sequence based on the cyclic shift value, that is, doing the cyclic shift on the pilots in symbols for carrying the pilots, in the PUCCH, where the value of $\Delta$ is subject to the following constraint:

$$\frac{N_{sc}}{\Delta} \geq N_{SF}^{PUCCH},$$

where $N_{sc}$ represents the number of sub-carriers occupied by the PUCCH in the frequency domain, and $N_{SF}^{PUCCH}$ represents the length of the orthogonal sequence; and particularly $\Delta$ can be one of values satisfying the condition above, pre-configured via higher-layer signaling, and a group of cyclic shift values can be determined based on this value.

Here the cyclic shift value can be notified via higher-layer signaling and/or DCI, and for example, an index (serial number) of the cyclic shift value can be notified via the higher-layer signaling or the DCI; or a set of cyclic shift values can be pre-configured via higher-layer signaling, and a cyclic shift value in the set can be notified to the user equipment via DCI; or an index of a cyclic shift value corresponding to an index of an orthogonal sequence can be determined according to the index of the orthogonal sequence, and then a set of predetermined correspondence relationships between indexes and cyclic shift values can be searched for the particular cyclic shift according to the index.

The number of cyclic shift values is dependent upon $N_{SF}^{PUCCH}$, and there is an interval of $\Delta$ between the respective cyclic shift values. Table 6 depicts a correspondence relationship between an index $n_{oc}$ of an orthogonal sequence, and a cyclic shift or an index $n_{cs}$ of the cyclic shift.

TABLE 6

A correspondence relationship between $n_{oc}$ and a cyclic shift

| $n_{oc}$ | Cyclic shift value or index $n_{cs}$ | | | |
|---|---|---|---|---|
| | $N_{SF}^{PUCCH} = 2$ | $N_{SF}^{PUCCH} = 3$ | $N_{SF}^{PUCCH} = 4$ | $N_{SF}^{PUCCH} = 6$ |
| 0 | 0 | 0 | 0 | 0 |
| 1 | 6 | 4 | 3 | 2 |
| 2 |   | 8 | 6 | 4 |
| 3 |   |   | 9 | 6 |
| 4 |   |   |   | 8 |
| 5 |   |   |   | 10 |

Of course, Table 6 depicts only an example, but the correspondence relationship between $n_{oc}$ and a cyclic shift will not be limited to that depicted in Table 6, and all the cyclic shift values satisfying the constraint above shall fall into the scope of the disclosure as claimed. For example, with $N_{SF}^{PUCCH}=2$, the cyclic shift interval $\Delta$ may be 6, and the set of candidate cyclic shift values may be {1, 7}, or {2, 8}, or {3, 9}, or {4, 10}, or {5, 11}, as long as the interval between the different cyclic shift values is 6; with $N_{SF}^{PUCCH}=3$, the cyclic shift interval $\Delta$ may be 4, and the set of candidate cyclic shift values may be {1, 5, 9}, or {2, 6, 10}, or {3, 7, 11}, as long as the interval between the different cyclic shift values is 4; with $N_{SF}^{PUCCH}=4$, the cyclic shift interval $\Delta$ may be 3, and the set of candidate cyclic shift values may be {1, 4, 7, 10}, or {2, 5, 8, 11}, as long as the interval between the different cyclic shift values is 3; and with $N_{SF}^{PUCCH}=6$, the cyclic shift interval $\Delta$ may be 2, and the set of candidate cyclic shift values may be {1, 3, 5, 7, 9, 11}, as long as the interval between the different cyclic shift values is 2.

As can be apparent from the description above, the user equipment obtains the information about the orthogonal sequence for the PUCCH, spreads the uplink control information carried in the PUCCH in the frequency domain according to the orthogonal sequence corresponding to the indication information of the orthogonal sequence, and transmits the uplink control information over the frequency resources corresponding to the PUCCH, so that the PUCCH can be spread in the frequency domain, and furthermore the number of user equipments for multiplexing in a PRB can be increased, and an overhead of PUCCH resources can be lowered.

Furthermore the embodiment of the disclosure can be applicable to spreading the new PDCCH format in the frequency domain, and in this case, a benefit of spreading in the frequency domain according to the embodiment of the disclosure as compared with spreading in the time domain lies in that: the same spreading scheme can be defined for a normal PUCCH and a shortened PUCCH, and a normal CP and an extended CP, as opposed to spreading in the time domain, in which the length of an orthogonal sequence has to be varied with a varying number of SC-FDMA symbols for carrying data, thus avoiding different lengths of time domain orthogonal sequences for a slot, which would otherwise limit a multiplexing capacity. For example, in the case that the length of an orthogonal sequence for a PUCCH is $N_{SF}^{PUCCH}$, $N_{SF}^{PUCCH}$ user equipments can transmit in one PRB occupied by the PUCCH, in a multiplexed mode according to the embodiment of the disclosure.

Figure 8:
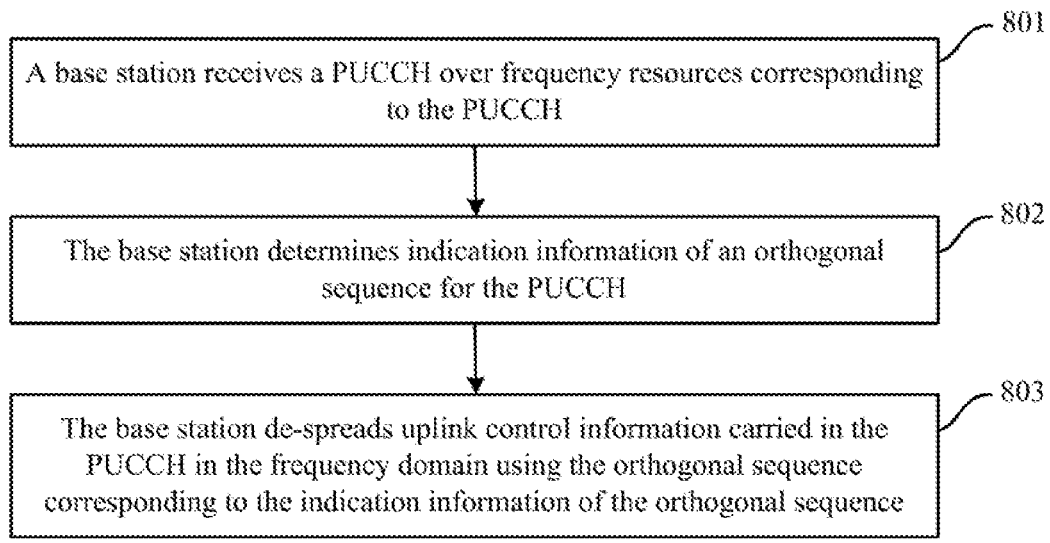
FIG. 8 is a schematic flow chart of frequency domain de-spreading and transmitting in the according to an embodiment of the disclosure.

Referring to FIG. 8 which is a schematic flow chart of de-spreading in the frequency domain according to an embodiment of the disclosure, the flow is performed at the base station side. The de-spreading flow can be regarded as an inverse process of the spreading flow illustrated in FIG. 2.

As illustrated, the flow can include the following steps 801 to 803.

In the step 801, a base station receives a PUCCH over frequency resources corresponding to the PUCCH.

In the step 802, the base station determines indication information of an orthogonal sequence for the PUCCH.

In the step 803, the base station de-spreads uplink control information carried in the PUCCH in the frequency domain using the orthogonal sequence corresponding to the indication information of the orthogonal sequence.

The de-spreading process at the base station side is an inverse process of the spreading process at the user equipment side. For example, for each symbol, except a symbol for transmitting a reference signal, among Single Carrier-Frequency Division Multiple Access (SC-FDMA) symbols occupied by the PUCCH, $N_{SF}^{PUCCH}$ data symbols in $N_{SF}^{PUCCH}$ REs in the SC-FDMA symbol are multiplied with a conjugated transposed sequence of an orthogonal sequence with the length of $N_{SF}^{PUCCH}$, and data modulation symbols after de-spreading are obtained.

Here REs in an RE group, onto which a data symbol is mapped, are distributed consecutively or discretely in the frequency domain; and/or REs in different RE groups, onto which different data symbols are mapped, are distributed in parallel or alternately in the frequency domain.

Here the step 803 can be performed by: for each SC-FDMA symbol used for carrying data, occupied by the PUCCH, multiplying a spread data symbol received in corresponding REs of the SC-FDMA symbol with a conjugated transposed sequence of the corresponding orthogonal sequence to obtain data symbols transmitted in the SC-FDMA symbol after de-spreading.

Optionally the length of the corresponding orthogonal sequence is 12, the corresponding orthogonal sequence is [+1, +1, +1, +1, +1, +1, +1, +1, +1, +1, +1, +1] or [+1, +1, +1, +1, +1, +1, −1, −1, −1, −1, −1, −1], a spread data symbol received in the i-th and (i+6)-th REs in the SC-FDMA symbol is multiplied with a conjugated transposed sequence of the i-th and (i+6)-th orthogonal codes in the corresponding orthogonal sequence, and the i-th one of six data symbols transmitted in the SC-FDMA symbol after de-spreading is obtained.

Furthermore the base station can further receive pilots of the PUCCH according to a cyclic shift value, where the cyclic shift value is one of values determined according to a cyclic shift interval satisfying $$\frac{Nsc}{\Delta} \geq N_{SF}^{PUCCH},$$

where Nsc represents the number of sub-carriers occupied by the PUCCH in the frequency domain, and $N_{SF}^{PUCCH}$ represents the length of the orthogonal sequence. Furthermore the base station can notify the cyclic shift value to the user equipment via higher-layer signaling and/or DCI.

Furthermore the base station can further notify an index of the orthogonal sequence for the PUCCH to the user equipment via higher-layer signaling and/or in a bit field in DCI, so that the user equipment spreads the uplink control information carried in the PUCCH according to the corresponding orthogonal sequence, where reference can be made to the embodiment above for the notification of the index of the orthogonal sequence, so a repeated description thereof will be omitted here.

Furthermore the base station can further notify a channel resource index of the PUCCH to the user equipment via higher-layer signaling and/or DCI, so that the user equipment determines an index of the orthogonal sequence for the PUCCH according to the channel resource index of the PUCCH, where reference can be made to the embodiment above for the notification of the channel resource index of the PUCCH, so a repeated description thereof will be omitted here.

Furthermore the base station can alternatively notify indication information of the frequency resources corresponding to the PUCCH to the user equipment via higher-layer signaling and/or DCI, so that the user equipment transmits the uplink control information carried in the PUCCH over the corresponding frequency resources, where the indication information of the frequency resources corresponding to the PUCCH can include one or more of: the number of PRBs, indexes of the PRBs, and a channel resource index of the PUCCH.

Based on the same technical conception, an embodiment of the disclosure further provides a schematic structural diagram of a user equipment, where the user equipment can perform the flow above of spreading and transmitting in the frequency domain.

Figure 9:
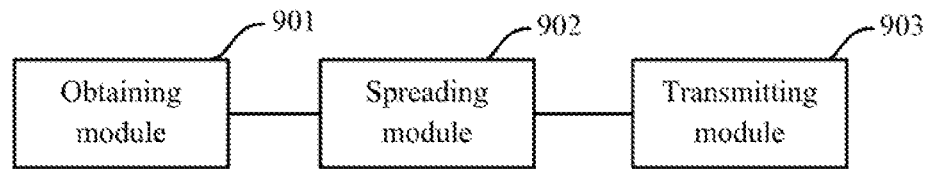
FIG. 9 is a schematic structural diagram of a user equipment according to an embodiment of the disclosure.

As illustrated in FIG. 9, the user equipment can include an obtaining module 901, a spreading module 902, and a transmitting module 903.

The obtaining module 901 is configured to obtain indication information of an orthogonal sequence for transmitting a PUCCH.

The spreading module 902 is configured to spread uplink control information carried in the PUCCH in the frequency domain according to the orthogonal sequence corresponding to the indication information of the orthogonal sequence.

The transmitting module 903 is configured to transmit the uplink control information after spreading, over frequency resources corresponding to the PUCCH.

Preferably the obtaining module 901 can be configured: to obtain an index of the orthogonal sequence for transmitting the PUCCH according to received higher-layer signaling and/or a bit field in received DCI; or to determine an index of the orthogonal sequence for transmitting the PUCCH according to a channel resource index of the PUCCH, where the channel resource index of the PUCCH is notified via higher-layer signaling and/or a bit field in DCI.

Here the obtaining module 901 can be configured: to determine an index of the orthogonal sequence for the PUCCH in a sub-frame in which the PUCCH is transmitted at least according to a channel resource index of the PUCCH and the length of the orthogonal sequence; or to determine an index of the orthogonal sequence for the PUCCH in a slot of a sub-frame in which the PUCCH is transmitted at least according to a channel resource index of the PUCCH, the length of the orthogonal sequence and an index of the slot; or to determine an index of the orthogonal sequence corresponding to the PUCCH in an SC-FDMA symbol of a sub-frame in which the PUCCH is transmitted at least according to a channel resource index of the PUCCH, the length of the orthogonal sequence and an index of the SC-FDMA symbol; or to determine an index of the orthogonal sequence corresponding to the PUCCH in an SC-FDMA symbol of a slot of a sub-frame in which the PUCCH is transmitted at least according to a channel resource index of the PUCCH, the length of the orthogonal sequence, an index of the slot, and an index of the SC-FDMA symbol in the slot.

Preferably the spreading module 902 can be configured: for each data symbol in the PUCCH, to multiply the data symbol with the corresponding orthogonal sequence to obtain a spread data symbol, and to map the spread data symbol onto a Resource Element (RE) group in an SC-FDMA symbol, where there are $N_{SF}^{PUCCH}$ REs in the RE group, and $N_{SF}^{PUCCH}$ represents the length of the orthogonal sequence.

Here REs in an RE group, onto which a data symbol is mapped, are distributed consecutively or discretely in the frequency domain; and/or REs in different RE groups, onto which different data symbols are mapped, are distributed in parallel or alternately in the frequency domain.

Preferably indication information of the frequency resources corresponding to the PUCCH is notified via higher-layer signaling and/or in a bit field in DCI.

Preferably indication information of the frequency resources corresponding to the PUCCH includes one or more of: the number of Physical Resource Blocks (PRBs), indexes of the PRBs, and a channel resource index of the PUCCH.

Here if the indication information of the frequency resources corresponding to the PUCCH includes the channel resource index of the PUCCH, then the indexes of the PRBs corresponding to the PUCCH are determined according to the channel resource index of the PUCCH.

Preferably the transmitting module 903 can be further configured: to do the cyclic shift on the pilots of the PUCCH according to a cyclic shift value, where the cyclic shift value is one of values determined according to a cyclic shift interval Δ satisfying $$\frac{N_{SC}}{\Delta} \geq N_{SF}^{PUCCH},$$

where Nsc represents the number of sub-carriers occupied by the PUCCH in the frequency domain, and $N_{SF}^{PUCCH}$ represents the length of the orthogonal sequence.

Preferably the cyclic shift value is notified via higher-layer signaling and/or DCI, or determined according to an index of the orthogonal sequence.

Preferably the spreading module 902 is configured: for each Single Carrier-Frequency Division Multiple Access (SC-FDMA) symbol used for carrying data, occupied by the PUCCH, to multiply data symbols transmitted in the SC-FDMA symbol with orthogonal codes in the corresponding orthogonal sequence, and to map the multiplied data symbols onto corresponding REs in the SC-FDMA symbol.

Preferably the length of the corresponding orthogonal sequence is 12, the corresponding orthogonal sequence is [+1, +1, +1, +1, +1, +1, +1, +1, +1, +1, +1, +1] or [+1, +1, +1, +1, +1, +1, −1, −1, −1, −1, −1, −1], the i-th one of six data symbols transmitted in the SC-FDMA symbol is multiplied with the i-th and (i+6)-th orthogonal codes in the corresponding orthogonal sequence, and mapped respectively onto the i-th and (i+6)-th REs in the SC-FDMA symbol.

Based on the same technical conception, an embodiment of the disclosure further provides a schematic structural diagram of a user equipment.

Figure 10:
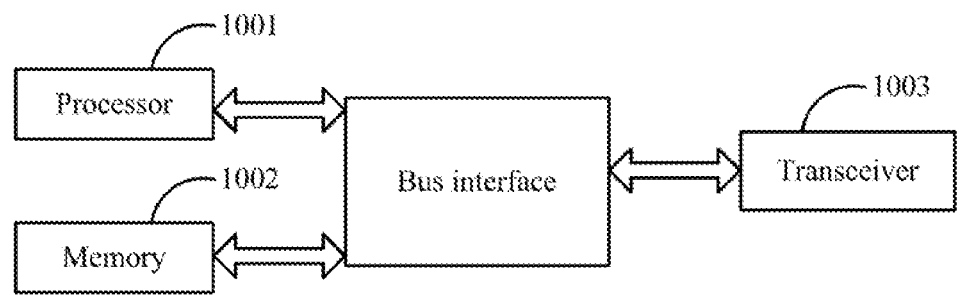
FIG. 10 is a schematic structural diagram of a user equipment according to another embodiment of the disclosure.

As illustrated in FIG. 10, a user equipment according to an embodiment of the disclosure can include a processor 1001, a memory 1002, a transceiver 1003, and a bus interface.

The processor 1001 is responsible for managing a bus architecture and performing normal processes, and the memory 1002 can store data for use by the processor 1001 in performing operations. The transceiver 1003 is configured to be controlled by the processor 1001 to receive and transmit data.

The bus architecture can include any number of interconnecting buses and bridges to particularly link together various circuits including one or more processors represented by the processor 1001, and one or more memories represented by the memory 1002. The bus architecture can further link together various other circuits, e.g., prophetical devices, manostats, power management circuits, etc., all of which are well known in the art, so a further description thereof will be omitted in this context. The bus interface serves as an interface. The transceiver 1003 can be a number of elements including a transmitter and a receiver, which are units for communication with various other devices over a transmission medium. The processor 1001 is responsible for managing the bus architecture and performing normal processes, and the memory 1002 can store data for use by the processor 1001 in performing the operations.

The flow of spreading and transmitting in the frequency domain at the user equipment side according to the embodiment of the disclosure can be applicable to the processor 1001, or performed by the processor 1001. In an implementation, the respective steps in the flow of spreading and transmitting in the frequency domain can be performed by an integrated logic circuit in hardware, or instructions in software, in the processor 1001. The processor 1001 can be a general-purpose processor, a digital signal processor, a dedicated integrated circuit, a field programmable gate array, or other programmable logic devices, discrete gates, or transistor logic devices, discrete hardware components to embody or perform the respective methods, steps, and logic block diagrams according to the embodiments of the disclosure. The general-purpose processor can be a microprocessor, any conventional processor, etc. The steps in the method according to the embodiment of the disclosure can be performed directly by a processor in hardware, or modules in hardware and software in the processor in combination. The software modules can reside in a random memory, a flash memory, a read-only memory, a programmable read-only memory or an electrically erasable, writable and programmable memory, a register, or any other storage medium well known in the art. The storage medium resides in the memory 1002, and the processor 1001 reads the information in the memory 1002, and performs the steps in the flow of spreading and transmitting in combination with the hardware thereof.

Particularly the processor 1001 is configured to read and execute the program in the memory 1002 to: obtain indication information of an orthogonal sequence for transmitting a PUCCH; spread uplink control information carried in the PUCCH in the frequency domain according to the orthogonal sequence corresponding to the indication information of the orthogonal sequence; and transmit the uplink control information after spreading, over frequency resources corresponding to the PUCCH.

Reference can be made to the embodiment above for a particular implementation of the flow, so a repeated description thereof will be omitted here.

Based on the same technical conception, an embodiment of the disclosure further provides a schematic structural diagram of a base station. The base station can perform the flow of de-spreading as described above.

Figure 11:
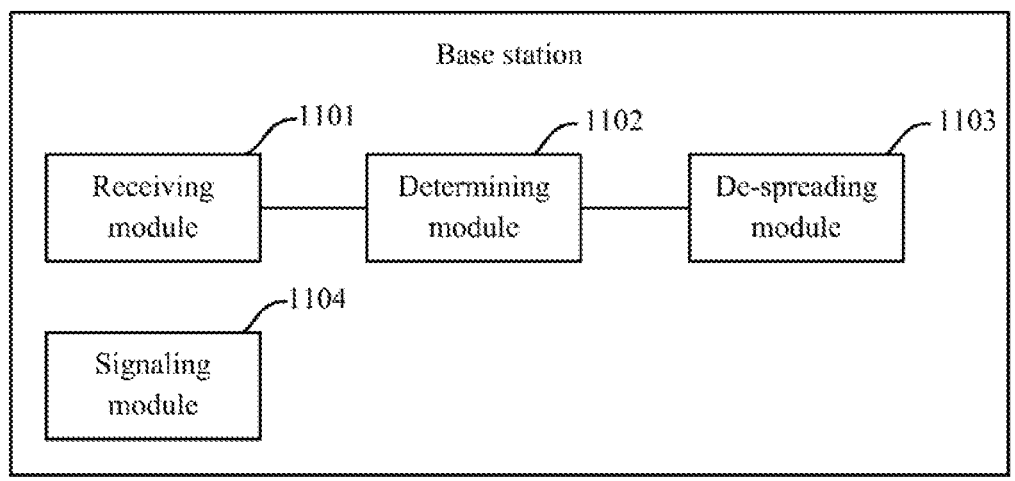
FIG. 11 is a schematic structural diagram of a base station according to an embodiment of the disclosure.

As illustrated in FIG. 11, the base station can include a receiving module 1101, a determining module 1102, and a de-spreading module 1103, and can further include a notifying module 1104.

The receiving module 1101 is configured to receive a PUCCH over frequency resources corresponding to the PUCCH.

The determining module 1102 is configured to determine indication information of an orthogonal sequence for the PUCCH.

The de-spreading module 1103 is configured to de-spread uplink control information carried in the PUCCH in the frequency domain using the orthogonal sequence corresponding to the indication information of the orthogonal sequence.

Furthermore the notifying module 1104 can be configured to notify an index of the orthogonal sequence for transmitting the PUCCH to a user equipment via higher-layer signaling, and/or a bit field in DCI; or to notify a channel resource index of the PUCCH to the user equipment via higher-layer signaling and/or DCI, so that the user equipment determines an index of the orthogonal sequence for the PUCCH according to the channel resource index of the PUCCH.

Preferably the de-spreading module 1103 can be configured, for each symbol, except for a symbol for transmitting a reference signal, among SC-FDMA symbols occupied by the PUCCH, to multiply $N_{SF}^{PUCCH}$ data symbols in $N_{SF}^{PUCCH}$ Resource Elements (REs) in the symbol with a conjugated transposed sequence of the orthogonal sequence with the length of $N_{SF}^{PUCCH}$, to obtain data modulation symbols after de-spreading, where REs in an RE group, onto which a data symbol is mapped, are distributed consecutively or discretely in the frequency domain; and/or REs in different RE groups, onto which different data symbols are mapped, are distributed in parallel or alternately in the frequency domain.

Furthermore the notifying module 1104 is further configured to notify indication information of the frequency resources corresponding to the PUCCH to the user equipment via higher-layer signaling and/or DCI, where the indication information of the frequency resources corresponding to the PUCCH includes one or more of: the number of PRBs, indexes of the PRBs, and a channel resource index of the PUCCH.

Furthermore the receiving module 1101 is further configured to receive pilots of the PUCCH according to a cyclic shift value, where the cyclic shift value is one of values determined according to a cyclic shift interval of Δ satisfying $$\frac{Nsc}{\Delta} \geq N_{SF}^{PUCCH},$$

where Nsc represents the number of sub-carriers occupied by the PUCCH in the frequency domain, and $N_{SF}^{PUCCH}$ represents the length of the orthogonal sequence.

Furthermore the notifying module 1104 is further configured to notify the cyclic shift value to the user equipment via higher-layer signaling and/or DCI.

Furthermore the de-spreading module 1103 is configured: for each SC-FDMA symbol used for carrying data, occupied by the PUCCH, to multiply a spread data symbol received in corresponding REs in the SC-FDMA symbol with a conjugated transposed sequence of the corresponding orthogonal sequence, to obtain data symbols transmitted in the SC-FDMA symbol after de-spreading.

Furthermore the length of the corresponding orthogonal sequence is 12, the corresponding orthogonal sequence is [+1, +1, +1, +1, +1, +1, +1, +1, +1, +1, +1, +1] or [+1, +1, +1, +1, +1, +1, −1, −1, −1, −1, −1, −1], a spread data symbol received in the i-th and (i+6)-th REs in the SC-FDMA symbol is multiplied with conjugated transposition of the i-th and (i+6)-th orthogonal codes in the corresponding orthogonal sequence, and the i-th one of six data symbols transmitted in the SC-FDMA symbol after de-spreading is obtained.

Based on the same technical conception, an embodiment of the disclosure further provides a schematic structural diagram of a base station.

Figure 12:
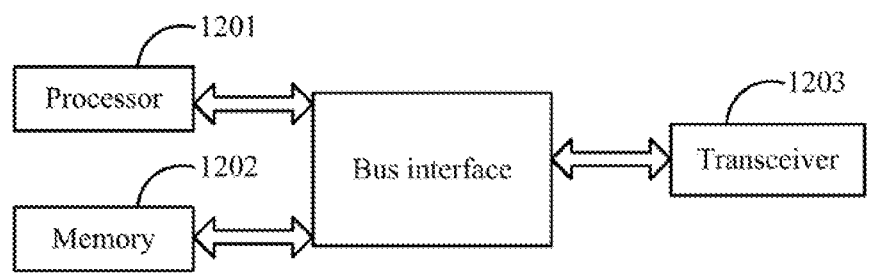
FIG. 12 is a schematic structural diagram of a base station according to another embodiment of the disclosure.

As illustrated in FIG. 12, a base station according to an embodiment of the disclosure can include a processor 1201, a memory 1202, a transceiver 1203, and a bus interface.

The processor 1201 is responsible for managing a bus architecture and performing normal processes, and the memory 1202 can store data for use by the processor 1201 in performing operations. The transceiver 1203 is configured to be controlled by the processor 1201 to receive and transmit data.

The bus architecture can include any number of interconnecting buses and bridges to particularly link together various circuits including one or more processors represented by the processor 1201, and one or more memories represented by the memory 1202. The bus architecture can further link together various other circuits, e.g., prophetical devices, manostats, power management circuits, etc., all of which are well known in the art, so a further description thereof will be omitted in this context. The bus interface serves as an interface. The transceiver 1203 can be a number of elements including a transmitter and a receiver, which are units for communication with various other devices over a transmission medium. The processor 1201 is responsible for managing the bus architecture and performing normal processes, and the memory 1202 can store data for use by the processor 1201 in performing the operations.

The flow of spreading and transmitting in the frequency domain at the base station side according to the embodiment of the disclosure can be applicable to the processor 1201, or performed by the processor 1201. In an implementation, the respective steps in the flow of de-spreading and transmitting in the frequency domain can be performed by an integrated logic circuit in hardware, or instructions in software, in the processor 1201. The processor 1201 can be a general-purpose processor, a digital signal processor, a dedicated integrated circuit, a field programmable gate array, or other programmable logic devices, discrete gates, or transistor logic devices, discrete hardware components to embody or perform the respective methods, steps, and logic block diagrams according to the embodiments of the disclosure. The general-purpose processor can be a microprocessor, any conventional processor, etc. The steps in the method according to the embodiment of the disclosure can be performed directly by a processor in hardware, or modules in hardware and software in the processor in combination. The software modules can reside in a random memory, a flash memory, a read-only memory, a programmable read-only memory or an electrically erasable, writable and programmable memory, a register, or any other storage medium well known in the art. The storage medium resides in the memory 1202, and the processor 1201 reads the information in the memory 1202, and performs the steps in the flow of de-spreading and transmitting in combination with the hardware thereof.

Particularly the processor 1201 is configured to read and execute the program in the memory 1202 to: receive a PUCCH over frequency resources corresponding to the PUCCH; determine indication information of an orthogonal sequence for the PUCCH; and de-spread uplink control information carried in the PUCCH in the frequency domain using the orthogonal sequence corresponding to the indication information of the orthogonal sequence.

Reference can be made to the embodiment above for a particular implementation of the flow, so a repeated description thereof will be omitted here.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

What is claimed is:

1. A method for frequency domain spreading and transmitting, the method comprising:

obtaining, by a user equipment, indication information of an orthogonal sequence for transmitting a Physical Uplink Control Channel (PUCCH);

spreading, by the user equipment, uplink control information carried in the PUCCH in the frequency domain according to the orthogonal sequence corresponding to the indication information of the orthogonal sequence; and transmitting, by the user equipment, the uplink control information after spreading, over frequency resources corresponding to the PUCCH;

wherein the spreading the uplink control information carried in the PUCCH in the frequency domain comprises:

for each data symbol in the PUCCH, multiplying the data symbol with the corresponding orthogonal sequence to obtain a spread data symbol, and mapping the spread data symbol onto a Resource Element (RE) group in an SC-FDMA symbol, wherein there are $N_{SF}^{PUCCH}$ REs in the RE group, and $N_{SF}^{PUCCH}$ represents a length of the orthogonal sequence.

2. The method according to claim 1, wherein the obtaining the indication information of the orthogonal sequence for transmitting the PUCCH comprises:

obtaining an index of the orthogonal sequence for transmitting the PUCCH according to received higher-layer signaling and/or a bit field in received Downlink Control Information (DCI); or determining an index of the orthogonal sequence for transmitting the PUCCH according to a channel resource index of the PUCCH, wherein the channel resource index of the PUCCH is notified via higher-layer signaling and/or a bit field in DCI.

3. The method according to claim 2, wherein the determining the index of the orthogonal sequence for transmitting the PUCCH according to the channel resource index of the PUCCH comprises:

determining the index of the orthogonal sequence for the PUCCH in a sub-frame in which the PUCCH is transmitted at least according to the channel resource index of the PUCCH and a length of the orthogonal sequence; or determining the index of the orthogonal sequence for the PUCCH in a slot of a sub-frame in which the PUCCH is transmitted at least according to the channel resource index of the PUCCH, a length of the orthogonal sequence and an index of the slot; or determining the index of the orthogonal sequence corresponding to the PUCCH in an SC-FDMA symbol of a sub-frame in which the PUCCH is transmitted at least according to the channel resource index of the PUCCH, a length of the orthogonal sequence and an index of the SC-FDMA symbol; or determining the index of the orthogonal sequence corresponding to the PUCCH in an SC-FDMA symbol of a slot of a sub-frame in which the PUCCH is transmitted at least according to the channel resource index of the PUCCH, a length of the orthogonal sequence, an index of the slot, and an index of the SC-FDMA symbol in the slot.

4. The method according to claim 1, wherein REs in an RE group, onto which a data symbol is mapped, are distributed consecutively or discretely in the frequency domain; and/or REs in different RE groups, onto which different data symbols are mapped, are distributed in parallel or alternately in the frequency domain.

5. The method according to claim 1, wherein the method further comprises:

doing the cyclic shift on the pilots of the PUCCH according to a cyclic shift value, wherein the cyclic shift value is one of values determined according to a cyclic shift interval Δ satisfying $$\frac{Nsc}{\Delta} \geq N_{SF}^{PUCCH},$$

wherein Nsc represents the number of sub-carriers occupied by the PUCCH in the frequency domain, and $N_{SF}^{PUCCH}$ represents a length of the orthogonal sequence.

6. The method according to claim 5, wherein the cyclic shift value is notified via higher-layer signaling and/or DCI, or determined according to an index of the orthogonal sequence.

7. The method according to claim 1, wherein the length of the orthogonal sequence is a positive integer exactly divisible by M, M is the number of sub-carriers occupied by a Physical Resource Block (PRB), and M is a positive integer; and/or wherein the orthogonal sequence is one or more of: a Walsh code orthogonal sequence, a Discrete Fourier Transform (DFT) orthogonal sequence, and a Discrete Cosine Transform (DCT) orthogonal sequence.

8. The method according to claim 1, wherein the spreading, by the user equipment, the uplink control information carried in the PUCCH in the frequency domain comprises:

for each SC-FDMA symbol used for carrying data, occupied by the PUCCH, multiplying data symbols transmitted in the SC-FDMA symbol with corresponding orthogonal codes in the corresponding orthogonal sequence, and mapping the multiplied data symbols onto corresponding REs in the SC-FDMA symbol.

9. The method according to claim 8, wherein the length of the corresponding orthogonal sequence is 12, the corresponding orthogonal sequence is [+1, +1, +1, +1, +1, +1, +1, +1, +1, +1, +1, +1] or [+1, +1, +1, +1, +1, +1, −1, −1, −1, −1, −1, −1], and the i-th one of six data symbols transmitted in the SC-FDMA symbol is multiplied with the i-th and (i+6)-th orthogonal codes in the corresponding orthogonal sequence, and mapped respectively onto the i-th and (i+6)-th REs in the SC-FDMA symbol.

10. A method for frequency domain de-spreading, the method comprising:

receiving, by a base station, a Physical Uplink Control Channel (PUCCH) over frequency resources corresponding to the PUCCH;

determining, by the base station, indication information of an orthogonal sequence for the PUCCH; and de-spreading, by the base station, uplink control information carried in the PUCCH in the frequency domain using the orthogonal sequence corresponding to the indication information of the orthogonal sequence;

wherein the de-spreading the uplink control information carried in the PUCCH in the frequency domain comprises:

for each symbol, except for a symbol for transmitting a reference signal, among Single Carrier-Frequency Division Multiple Access (SC-FDMA) symbols occupied by the PUCCH, multiplying $N_{SF}^{PUCCH}$ data symbols in $N_{SF}^{PUCCH}$ Resource Elements (REs) in the symbol with a conjugated transposed sequence of the orthogonal sequence with the length of $N_{SF}^{PUCCH}$, to obtain data modulation symbols after de-spreading.

11. The method according to claim 10, wherein the method further comprises:
notifying, by the base station, an index of the orthogonal sequence for transmitting the PUCCH, to a user equipment via higher-layer signaling and/or a bit field in Downlink Control Information (DCI); or
notifying, by the base station, a channel resource index of the PUCCH to the user equipment via higher-layer signaling and/or DCI, so that the user equipment determines an index of the orthogonal sequence for the PUCCH according to the channel resource index of the PUCCH.

12. The method according to claim 10, wherein REs in an RE group, onto which a data symbol is mapped, are distributed consecutively or discretely in the frequency domain; and/or
REs in different RE groups, onto which different data symbols are mapped, are distributed in parallel or alternately in the frequency domain.

13. The method according to claim 10, wherein the method further comprises:
receiving, by the base station, pilots of the PUCCH according to a cyclic shift value, wherein the cyclic shift value is one of values determined according to a cyclic shift interval Δ satisfying $$\frac{Nsc}{\Delta} \geq N_{SF}^{PUCCH},$$

wherein Nsc represents the number of sub-carriers occupied by the PUCCH in the frequency domain, and $N_{SF}^{PUCCH}$ represents a length of the orthogonal sequence.

14. The method according to claim 13, wherein the method further comprises:
notifying, by the base station, the cyclic shift value to the user equipment via higher-layer signaling and/or DCI.

15. The method according to claim 10, wherein the length of the orthogonal sequence is a positive integer exactly divisible by M, M is the number of sub-carriers occupied by a Physical Resource Block (PRB), and M is a positive integer; and/or
wherein the orthogonal sequence is one or more of: a Walsh code orthogonal sequence, a Discrete Fourier Transform (DFT) orthogonal sequence, and a Discrete Cosine Transform (DCT) orthogonal sequence.

16. The method according to claim 10, wherein the de-spreading the uplink control information carried in the PUCCH in the frequency domain comprises:
for each SC-FDMA symbol used for carrying data, occupied by the PUCCH, multiplying a spread data symbol received in corresponding REs in the SC-FDMA symbol with a conjugated transposed sequence of the corresponding orthogonal sequence, to obtain data symbols transmitted in the SC-FDMA symbol after de-spreading.

17. The method according to claim 16, wherein the length of the corresponding orthogonal sequence is 12, the corresponding orthogonal sequence is [+1, +1, +1, +1, +1, +1, +1, +1, +1, +1, +1, +1] or [+1, +1, +1, +1, +1, +1, −1, −1, −1, −1, −1, −1], a spread data symbol received in the i-th and (i+6)-th REs in the SC-FDMA symbol is multiplied with conjugated transposition of the i-th and (i+6)-th orthogonal codes in the corresponding orthogonal sequence, and the i-th one of six data symbols transmitted in the SC-FDMA symbol after de-spreading is obtained.

18. A user equipment, comprising:
a processor configured to read and execute program in a memory:
to obtain indication information of an orthogonal sequence for transmitting a Physical Uplink Control Channel (PUCCH);
to spread uplink control information carried in the PUCCH in the frequency domain according to the orthogonal sequence corresponding to the indication information of the orthogonal sequence; and
to transmit the uplink control information after spreading over frequency resources corresponding to the PUCCH through a transceiver; and
the transceiver configured to be controlled by the processor to receive and transmit data;
wherein the processor is configured:
for each data symbol in the PUCCH, to multiply the data symbol with the corresponding orthogonal sequence to obtain a spread data symbol, and to map the spread data symbol onto a Resource Element (RE) group in an SC-FDMA symbol, wherein there are $N_{SF}^{PUCCH}$ REs in the RE group, and $N_{SF}^{PUCCH}$ represents a length of the orthogonal sequence.

19. The user equipment according to claim 18, wherein the processor is configured:
to obtain an index of the orthogonal sequence for transmitting the PUCCH according to higher-layer signaling and/or a bit field in Downlink Control Information (DCI), received through the transceiver; or
to determine an index of the orthogonal sequence for transmitting the PUCCH according to a channel resource index of the PUCCH, wherein the channel resource index of the PUCCH is notified via higher-layer signaling and/or a bit field in DCI.

20. The user equipment according to claim 19, wherein the processor is configured:
to determine the index of the orthogonal sequence for the PUCCH in a sub-frame in which the PUCCH is transmitted at least according to the channel resource index of the PUCCH and a length of the orthogonal sequence; or
to determine the index of the orthogonal sequence for the PUCCH in a slot of a sub-frame in which the PUCCH is transmitted at least according to the channel resource index of the PUCCH, a length of the orthogonal sequence and an index of the slot; or
to determine the index of the orthogonal sequence corresponding to the PUCCH in an SC-FDMA symbol of a sub-frame in which the PUCCH is transmitted at least according to the channel resource index of the PUCCH, a length of the orthogonal sequence and an index of the SC-FDMA symbol; or
to determine the index of the orthogonal sequence corresponding to the PUCCH in an SC-FDMA symbol of a slot of a sub-frame in which the PUCCH is transmitted at least according to the channel resource index of the PUCCH, a length of the orthogonal sequence, an index of the slot, and an index of the SC-FDMA symbol in the slot.

21. The user equipment according to claim 18, wherein the processor is further configured:
to do the cyclic shift on the pilots of the PUCCH according to a cyclic shift value, wherein the cyclic shift value is one of values determined according to a cyclic shift interval Δ satisfying $$\frac{N_{sc}}{\Delta} \geq N_{SF}^{PUCCH},$$

wherein Nsc represents the number of sub-carriers occupied by the PUCCH in the frequency domain, and $N_{SF}^{PUCCH}$ represents a length of the orthogonal sequence.

22. The user equipment according to claim 18, wherein the processor is configured:
for each SC-FDMA symbol used for carrying data, occupied by the PUCCH, to multiply data symbols transmitted in the SC-FDMA symbol with corresponding orthogonal codes in the corresponding orthogonal sequence, and to map the multiplied data symbols onto corresponding REs in the SC-FDMA symbol.

23. The user equipment according to claim 22, wherein the length of the corresponding orthogonal sequence is 12, and the corresponding orthogonal sequence is [+1, +1, +1, +1, +1, +1, +1, +1, +1, +1, +1, +1] or [+1, +1, +1, +1, +1, +1, −1, −1, −1, −1, −1, −1]; and the processor is configured to multiply the i-th one of six data symbols transmitted in the SC-FDMA symbol with the i-th and (i+6)-th orthogonal codes in the corresponding orthogonal sequence, and to map the data symbol onto the i-th and (i+6)-th REs in the SC-FDMA symbol.

24. A base station, comprising:
a processor configured to read and execute program in a memory:
to receive a Physical Uplink Control Channel (PUCCH) over frequency resources corresponding to the PUCCH through a transceiver;
to determine indication information of an orthogonal sequence for the PUCCH; and
to de-spread uplink control information carried in the PUCCH in the frequency domain using the orthogonal sequence corresponding to the indication information of the orthogonal sequence; and
the transceiver configured to be controlled by the processor to receive and transmit data,
wherein the processor is configured:
for each symbol, except for a symbol for transmitting a reference signal, among Single Carrier-Frequency Division Multiple Access (SC-FDMA) symbols occupied by the PUCCH, to multiply $N_{SF}^{PUCCH}$ data symbols in $N_{SF}^{PUCCH}$ Resource Elements (REs) in the symbol with a conjugated transposed sequence of the orthogonal sequence with the length of $N_{SF}^{PUCCH}$, to obtain data modulation symbols after de-spreading.

25. The base station according to claim 24, wherein the transceiver is further configured:
to notify an index of the orthogonal sequence for transmitting the PUCCH to a user equipment via higher-layer signaling and/or a bit field in Downlink Control Information (DCI); or
to notify a channel resource index of the PUCCH to the user equipment via higher-layer signaling and/or DCI, so that the user equipment determines an index of the orthogonal sequence for the PUCCH according to the channel resource index of the PUCCH.

26. The base station according to claim 24, wherein the transceiver is further configured:
to receive pilots of the PUCCH according to a cyclic shift value, wherein the cyclic shift value is one of values determined according to a cyclic shift interval Δ satisfying $$\frac{N_{sc}}{\Delta} \geq N_{SF}^{PUCCH},$$

wherein Nsc represents the number of sub-carriers occupied by the PUCCH in the frequency domain, and $N_{SF}^{PUCCH}$ represents a length of the orthogonal sequence.

27. The base station according to claim 24, wherein the processor is configured:
for each SC-FDMA symbol used for carrying data, occupied by the PUCCH, to multiply a spread data symbol received in corresponding REs in the SC-FDMA symbol with a conjugated transposed sequence of the corresponding orthogonal sequence, to obtain data symbols transmitted in the SC-FDMA symbol after de-spreading.

28. The base station according to claim 27, the length of the corresponding orthogonal sequence is 12, and the corresponding orthogonal sequence is [+1, +1, +1, +1, +1, +1, +1, +1, +1, +1, +1, +1] or [+1, +1, +1, +1, +1, +1, −1, −1, −1, −1, −1, −1]; and the processor is configured to multiply a spread data symbol received in the i-th and (i+6)-th REs in the SC-FDMA symbol with conjugated transposition of the i-th and (i+6)-th orthogonal codes in the corresponding orthogonal sequence, to obtain the i-th one of six data symbols transmitted in the SC-FDMA symbol after de-spreading.

* * * * *